US012732378B2

(12) United States Patent
Savanah et al.

(10) Patent No.: US 12,732,378 B2
(45) Date of Patent: *Sep. 8, 2026

(54) IMPLEMENTING LOGIC GATE FUNCTIONALITY USING A BLOCKCHAIN

(71) Applicant: nChain Licensing AG, Zug (CH)

(72) Inventors: Stephane Savanah, London (GB); Craig Steven Wright, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/097,546

(22) PCT Filed: Apr. 28, 2017

(86) PCT No.: PCT/IB2017/052466

§ 371 (c)(1),
(2) Date: Oct. 29, 2018

(87) PCT Pub. No.: WO2017/187398

PCT Pub. Date: Nov. 2, 2017

(65) Prior Publication Data

US 2019/0149337 A1 May 16, 2019

(30) Foreign Application Priority Data

Apr. 29, 2016 (GB) ..................................... 1607472
Apr. 29, 2016 (GB) ..................................... 1607520

(Continued)

(51) Int. Cl.
*H04L 9/32* (2006.01)
*G06Q 20/36* (2012.01)

(Continued)

(52) U.S. Cl.
CPC ....... *H04L 9/3239* (2013.01); *G06Q 20/3678* (2013.01); *H04L 9/3066* (2013.01);

(Continued)

(58) Field of Classification Search
CPC ..... H04L 9/3239; H04L 9/3066; H04L 9/321; H04L 9/3252; H04L 2209/38; H04L 2209/56; G06Q 20/3678; G06Q 2220/00

(Continued)

(56) References Cited

U.S. PATENT DOCUMENTS

RE38,451 E 3/2004 Veenstra
8,261,085 B1 * 9/2012 Fernandez ............ G06F 21/565 711/119

(Continued)

FOREIGN PATENT DOCUMENTS

CN 1570853 A * 1/2005
EP 3125489 A1 * 2/2017 ........... G06Q 20/065

(Continued)

OTHER PUBLICATIONS

Antonopoulos, Andreas M. Mastering Bitcoin: unlocking digital cryptocurrencies. "O'Reilly Media, Inc.", 2014, 282 pages (Year: 2014).*

(Continued)

*Primary Examiner* — Shahriar Zarrineh

(74) *Attorney, Agent, or Firm* — Tarolli, Sundheim, Covell & Tummino LLP

(57) ABSTRACT

Blockchain transactions are created to implement the functionality of a logic gate. Implementation may be on the Bitcoin platform or an alternative blockchain platform. The transaction includes a locking script which comprises instructions selected so as to implement the functionality of a logic gate such as the XOR gate. When the script is executed (because a second transaction is attempting to spend the output associated with the locking script) the inputs will be processed by the conditional instructions to provide an output of TRUE or FALSE. The second transaction is transmitted to the blockchain network for valida- (Continued)

tion and, if determined to be valid, it will be written to the blockchain. Validation of the second transaction can be interpreted as a TRUE output. Thus, the locking script of the first transaction provides the functionality of the desired logic gate.

17 Claims, 15 Drawing Sheets

(30) Foreign Application Priority Data

Apr. 29, 2016 (GB) .................................... 1607525
Apr. 29, 2016 (GB) .................................... 1607527
Apr. 29, 2016 (GB) .................................... 1607529
Apr. 29, 2016 (GB) .................................... 1607530
Apr. 29, 2016 (GB) .................................... 1607537
Apr. 29, 2016 (GB) .................................... 1607538
Apr. 29, 2016 (GB) .................................... 1607539
Apr. 29, 2016 (GB) .................................... 1607541
Apr. 29, 2016 (GB) .................................... 1607552
Apr. 29, 2016 (GB) .................................... 1607553
Apr. 29, 2016 (GB) .................................... 1607554
Apr. 29, 2016 (GB) .................................... 1607555
Apr. 29, 2016 (GB) .................................... 1607558
Apr. 29, 2016 (GB) .................................... 1607561
Apr. 29, 2016 (GB) .................................... 1607564
Apr. 29, 2016 (GB) .................................... 1607566
Apr. 29, 2016 (GB) .................................... 1607569
Apr. 29, 2016 (GB) .................................... 1607584

(51) Int. Cl.
*H04L 9/30* (2006.01)
*H04L 9/00* (2022.01)

(52) U.S. Cl.
CPC ............ *H04L 9/321* (2013.01); *H04L 9/3252* (2013.01); *G06Q 2220/00* (2013.01); *H04L 9/50* (2022.05); *H04L 2209/56* (2013.01)

(58) Field of Classification Search
USPC .......................................................... 713/168
See application file for complete search history.

(56) References Cited

U.S. PATENT DOCUMENTS 9,063,978 B1* 6/2015 Kapoor ..................... G06F 8/20
9,933,760 B2 4/2018 Bonnat
10,050,779 B2 8/2018 Alness et al.
10,523,443 B1* 12/2019 Kleinman ............. H04L 9/3247
11,341,484 B2 5/2022 Wright et al.
2004/0015496 A1* 1/2004 Anonsen ............... G06F 16/289
2004/0151382 A1* 8/2004 Stellenberg ......... H04L 63/1416 382/219
2004/0215650 A1* 10/2004 Shaji ..................... H04L 41/084
2005/0120133 A1 6/2005 Slack-Smith
2005/0188085 A1 8/2005 Lin et al.
2005/0246302 A1* 11/2005 Lorenz .................. G06N 5/025 706/47
2007/0013967 A1 1/2007 Ebaugh et al.
2007/0136155 A1* 6/2007 Chape .................... G06Q 40/02 705/30
2007/0152709 A1 7/2007 Gerhart
2008/0126065 A1* 5/2008 Nicholas ................ G06F 30/33 703/15
2010/0058477 A1* 3/2010 Ciet ....................... H04L 9/002 726/26
2011/0088043 A1 4/2011 Lind et al.
2011/0113238 A1 5/2011 Jennings et al.
2011/0218891 A1* 9/2011 Sjelvgren ............... G06Q 40/12 705/30
2013/0197752 A1 8/2013 Planche et al.
2015/0074159 A1* 3/2015 Poschmann .............. G09C 1/00 708/270
2015/0120567 A1 4/2015 Van Rooyen et al.
2015/0163992 A1 6/2015 Anderson
2015/0206106 A1 7/2015 Yago
2015/0244690 A1* 8/2015 Mossbarger .............. H04L 9/50 713/171
2015/0269570 A1 9/2015 Phan et al.
2015/0278820 A1 10/2015 Meadows
2015/0324764 A1* 11/2015 Van Rooyen ...... G06Q 20/0655 705/69
2015/0332283 A1* 11/2015 Witchey ................. G16H 10/60 705/3
2015/0379510 A1* 12/2015 Smith ..................... G06F 21/64 705/71
2016/0085955 A1* 3/2016 Lerner .................. G06F 21/725 726/20
2016/0086175 A1 3/2016 Finlow-Bates et al.
2016/0098723 A1 4/2016 Feeney
2016/0134431 A1 5/2016 Ebrom et al.
2016/0217436 A1* 7/2016 Brama ................... G06Q 20/10
2016/0269182 A1* 9/2016 Sriram .................. H04L 9/0869
2016/0292672 A1* 10/2016 Fay .................... G06Q 20/3827
2016/0330031 A1* 11/2016 Drego .................. H04L 9/3239
2016/0358267 A1* 12/2016 Arjomand ........... G06Q 20/381
2017/0034197 A1* 2/2017 Daniel ................ H04L 63/1458
2017/0091750 A1* 3/2017 Maim ....................... H04L 9/14
2017/0091756 A1* 3/2017 Stern ...................... G06Q 20/36
2017/0109748 A1* 4/2017 Kote ...................... G06Q 40/12
2017/0140408 A1* 5/2017 Wuehler ............ G06Q 30/0207
2017/0154193 A1* 6/2017 Leiserson ............... G06F 21/71
2017/0178417 A1* 6/2017 Bekas .................. G07B 15/063
2017/0212781 A1* 7/2017 Dillenberger ......... G06F 9/5038
2017/0214701 A1 7/2017 Hasan
2017/0220815 A1* 8/2017 Ansari ................. G06Q 20/389
2017/0220998 A1 8/2017 Horn et al.
2017/0243193 A1* 8/2017 Manian ............. G06Q 20/3829
2017/0243212 A1* 8/2017 Castinado ............ G06Q 20/389
2017/0244707 A1* 8/2017 Johnsrud ............... H04L 9/3247
2017/0270527 A1* 9/2017 Rampton ............. G06Q 20/384
2017/0279774 A1* 9/2017 Booz .................... G06Q 20/223
2017/0287068 A1 10/2017 Nugent
2017/0287090 A1 10/2017 Hunn et al.
2017/0316390 A1* 11/2017 Smith .................. G06Q 20/407
2017/0344435 A1 11/2017 Davis
2018/0113752 A1 4/2018 Derbakova et al.
2018/0139043 A1 5/2018 Jayachandran et al.
2018/0139278 A1 5/2018 Bathen et al.
2018/0167217 A1* 6/2018 Brady ..................... H04L 67/10
2018/0189333 A1 7/2018 Childress et al.
2018/0191503 A1* 7/2018 Alwar ................... H04L 9/3242
2018/0232413 A1 8/2018 Eshwar et al.
2018/0248880 A1 8/2018 Sardesai et al.
2018/0253702 A1* 9/2018 Dowding ............... G06Q 20/06
2018/0268151 A1 9/2018 Cuomo et al.
2019/0042734 A1* 2/2019 Kounavis ............ G06F 11/1048
2019/0179801 A1* 6/2019 Jang ...................... G06F 16/137
2019/0364042 A1 11/2019 Liu et al.
2020/0050930 A1 2/2020 Pirim
2020/0327498 A1 10/2020 Weber et al.
2020/0358812 A1 11/2020 Xiao

FOREIGN PATENT DOCUMENTS

FR 3018379 A1 9/2015
GB 201413284 A0 9/2014
GB 201416822 11/2014
GB 2514716 A * 12/2014 ............ G06F 21/00
GB 201605154 5/2016
GB 2540975 A 2/2017

(56) References Cited

FOREIGN PATENT DOCUMENTS

WO 2015144971 A1 10/2015
WO 2017011601 A1 1/2017

OTHER PUBLICATIONS

Huw Fryer, and Elena Simperl, Attaching Semantic Metadata to Cryptocurrency Transactions, 2014, University of Southampton, Southampton, UK, 31 pages (Year: 2014).*
Noam Nisan • Shimon Schocken, Boolean Logic, Publication Date: Jan. 1, 2008, Part of: The Elements of Computing Systems: Building a Modern Computer from First Principles, 22 pages (Year: 2008).*
Giechaskiel, iLLias, An evaluation of the effects of broken cryptographic primitives on Bitcoin, 27/2015, CDT in Cyber Security, University of Oxford, Oxford, UK ilias.giechaskiel@cybersecurity.ox.ac.uk, 20 pages (Year: 2015).*
Koshik Raj, Locking and unlocking scripts , https://www.oreilly.com/library/view/foundations-of-blockchain/9781789139396/f7a67e71-dbf2-469c-900c-8f4ba4ccafc3.xhtml#:~:text=Bitcoin%20transactions%20use%20locking%20and,two%20scripts%20are%20executed%20together. (Year: 2023).*
What is Bitcoin locking and unlocking script?, https://bitcoin.stackexchange.com/questions/75165/what-is-bitcoin-locking-and-unlocking-script, May 15, 2018 (Year: 2018).*
Simon Barber, Bitter to Better—How to Make Bitcoin a Better Currency, International Conference on Financial Cryptography and Data Security. FC 2012: Financial Cryptography and Data Security pp. 399-414 , 16 pages (Year: 2012).*
Alam et al., "Bitcoin for smart trading in smart grid," The 21st IEEE International Workshop on Local and Metropolitan Area Networks, Apr. 22, 2015, 2 pages.
Allison, "Ethereum-based Slock.it reveals first ever lock opened with money," International Business Times, Dec. 17, 2015 [retrieved Jul. 20, 2020], https://www.ibtimes.co.uk/ethereum-based-slock-reveals-first-ever-lock-opened-money-1527014, 3 pages.
Andrychowicz et al., "Secure Multiparty Computations on Bitcoin," IEEE Symposium on Security and Privacy, May 1, 2014, 18 pages.
Anonymous, "Distributed Hash Tables and Consistent Hashing," CloudFundoo, https://cloudfundoo.wordpress.com/2012/05/28/distributed-hash-tables-and-consistent-hashing, May 28, 2012, 7 pages.
Anonymous, "Universal Blockchained Health Record," The IP.com Journal, Apr. 13, 2016, 3 pages.
Anonymous, "What is Ethereum?," EtherScripter, https://web.archive.org/web/20160329151319/http://etherscripter.com/what_is_ethereum.html, archived Mar. 29, 2016 [retrieved Feb. 21, 2019], 4 pages.
Bertani, "Fehu: E-commerce and security, on the same page," Fehu Labs, Apr. 19, 2016, 22 pages.
Bertani, "Oraclize: App Beta; Use case-driven approach; Overview," Oraclize, http://docs.oraclize.it, http://app.oraclize.it/contracts/create, and https://blog.oraclize.it/use-case-driven-approach-a54b1fcbd2d2#.jxot32mxq, copyright 2016 [retrieved Nov. 2, 2016], 15 pages.
Bitcoinwiki, "Script," Creative Commons Attribution 3.0, Jul. 28, 2012.
Bluematt et al., "Chat Logs Sep. 28, 2014," Bitcoin Wizards IRC Channel, https://download.wpsoftware.net/bitcoin/wizards/2014-09-28.html, Sep. 28, 2014, 4 pages.
Buterin, "Ethereum and Oracles," Ethereum Blog, Jul. 22, 2014 [retrieved Feb. 5, 2018], https://blog.ethereum.org/2014/07/22/ethereum-and-oracles/, 16 pages.
Buterin, "Privacy on the Blockchain," Ethereum Blog, Jan. 15, 2016 (retreived Jul. 20, 2020), https://blog.ethereum.org/2016/01/15/privacy-on-the-blockchain/, 14 pages.
Capodieci et al., "I need some phasing aka smart contract material," Nxt Forum, Apr. 27, 2015 [retrieved Apr. 4, 2017], https://nxtforum.org/general-discussion/i-need-some-phasing-aka-smart-contract-material, 9 pages.
Cassano, "What Are Smart Contracts? Cryptocurrency's Killer App," Fast Company, https://www.fastcompany.com/3035723/smart-contracts-could-be-cryptocurrencys-killer-app, Sep. 17, 2014 [retrieved Feb. 27, 2019], 7 pages.
Counterparty, "Documentation," Counterparty, https://counterparty.io/docs/, copyright 2014 [retrieved Sep. 20, 2016], 2 pages.
EITC Holdings Limited, "Universal tokenisation system for blockchain based cryptocurrencies," United Kingdom Patent Application No. 1603125.4, Feb. 23, 2016, 1 page.
Garzik et al., "Tweet May 30, 2014," Twitter, https://twitter.com/jgarzik/status/472574342514368512, May 30, 2014 [retrieved Mar. 14, 2019], 1 page.
Garzik, "'Master key multi-sig' protocol, where the N of M threshold idea is used but a specific 'master' key must be present. 'T + M of N ' So you can give others multi-sig keys but they can't collude behind your back," Reddit, May 13, 2015 [retrieved Nov. 2, 2016], https://www.reddit.com/r/Bitcoin/comments/35wjai/master_key_multisig_protocol_where_the_n_of_m/, 4 pages.
Garzik, "[Bitcoin-development] Pay to MultiScript hash:," Linux Foundation, https://lists.linuxfoundation.org/pipermail/bitcoin-dev/2014-July/006276.html, Jul. 17, 2014, 1 page.
Garzik, "[Bitcoin-development] Presenting a BIP for Shamir's Secret Sharing of Bitcoin private keys," Linux Foundation, https://lists.linuxfoundation.org/pipermail/bitcoin-dev/2014-March/004908.html, Mar. 29, 2014, 1 page.
Geremia et al., "Multisignature," Bitcoin Wiki, Jan. 5, 2016 revision (first disclosed Mar. 8, 2015) [retrieved Jul. 20, 2020], https://en.bitcoin.it/w/index.php?title=Multisignature&oldid=59815, 3 pages.
Godislove et al., "Thoughts on M of N systems (competing and heirarchically nested)," Bitcoin Forum, Jun. 20, 2014 [retrieved Apr. 4, 2017], https://bitcointalk.org/index.php?topic=659131.msg7433669#msg7433669, 8 pages.
Greenspan, "Beware the impossible smart contract," Linkedin, https://www.linkedin.com/pulse/beware-impossible-smart-contract-gideon-greenspan, Apr. 12, 2016 [retrieved Feb. 27, 2019], 8 pages.
Hearn, "Distributed markets," Bitcoin Wiki, https://en.bitcoin.it/wiki/Distributed_markets, Jul. 11, 2015 [retrieved Sep. 20, 2016], 5 pages.
Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.
International Search Report and Written Opinion mailed Jul. 14, 2017, Patent Application No. PCT/IB2017/052466, 11 pages.
International Search Report and Written Opinion mailed Jul. 14, 2017, Patent Application No. PCT/IB2017/052467, 11 pages.
International Search Report and Written Opinion mailed Jul. 18, 2017, Patent Application No. PCT/IB2017/052464, 10 pages.
International Search Report and Written Opinion mailed Jul. 7, 2017, Patent Application No. PCT/IB2017/052463, 11 pages.
Justanotheruser et al., "Chat Log Jan. 9-10, 2014," Bitcoin Wizards IRC Channel, https://download.wpsoftware.net/bitcoin/wizards/2014/01/14-01-09.log, Jan. 9, 2014, 11 pages.
Kiviat, "Beyond Bitcoin: Issues in Regulating Blockchain Transactions," Duke Law Journal 65(3):569-608, Dec. 2015.
Liang et al., "White Paper," GitHub, https://github.com/ethereum/wiki/wiki/white-paper/5f59d858bf36d6f2f6650f1f30f0b8b015741d73, Apr. 13, 2016 [retrieved Feb. 27, 2019], 37 pages.
Markjoingwar et al., "So can you make a complex script and put it into a P2SH address, and it doesn't have to be one of the standard transaction types right? Doesn't this mean Bitcoin can be Turing complete in some cases?," Redditr/bitcoin, https://www.reddit.com/r/Bitcoin/comments/408cof/so_can_you_make_a_complex_script_and_put_it_into/, Jan. 9, 2016 [retrieved Feb. 27, 2019], 5 pages.
Mike et al., "Contract," Bitcoin Wiki, https://en.bitcoin.it/wiki/Contract, Aug. 10, 2017 [retrieved Feb. 5, 2018], 13 pages.
Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172, 11 pages.
Morrison, "Blockchain and smart contract automation: How smart contracts automate digital business," PwC Technology Forecast,

(56) References Cited

OTHER PUBLICATIONS copyright 2016, https://www.pwc.com/us/en/technology-forecast/2016/blockchain/pwc-smart-contract-automation-digital-business.pdf, 8 pages.
Netizen_Cookie et al., "I recently told my boyfriend that I want to marry him without involving the state. He said yes and suggested we "put it on the blockchain" (which is, of course, how I know I picked the right one). Anyone know how to go about this via smart contracts or colored coins or something? Need specifics," https://www.reddit.com/r/Bitcoin/comments/2citbd/i_recently_told_my_boyfriend_that_i_want_to_marry/, Aug. 3, 2014 [Sep. 20, 2016], 32 pages.
Newman et al., "Contracts and Transactions," Github, Aug. 24, 2015 [retrieved Apr. 4, 2017], https://github.com/ethereum/go-ethereum/wiki/Contracts-and-Transactions, 12 pages.
Ngo, "Counterparty Announces Ethereum Virtual Machine for Smart Contracts Creation on the Bitcoin Blockchain," Coin Journal, http://coinjournal.net/counterparty-ethereum-virtual-machine-smart-contracts-bitcoinblockchain/, Jun. 8, 2016 [retrieved Sep. 20, 2016], 3 pages.
Omohundro, "Cryptocurrencies, Smart Contracts, and Artificial Intelligence," Oct. 22, 2014 (retrieved Jul. 20, 2020), https://steveomohundro.com/2014/10/, 7 pages.
Omunhundro, "Smart Contracts," Possibility Research, Oct. 26, 2014 (retrieved Jul. 20, 2020), 33 pages.
Piasecki et al., "Talk:Script," Bitcoin Wiki, https://en.bitcoin.it/wiki/Talk:Script, Dec. 20, 2011 (most recent edit Nov. 15, 2015) [retrieved Feb. 27, 2019], 2 pages.
Pyongyangpothead, "Multi-Blockchain uses?," Reddit r/ethdev, https://www.reddit.com/r/ethdev/comments/4c6xd4/multiblockchain_uses/, Mar. 27, 2016 [retrieved Feb. 27, 2019], 2 pages.
Rampton, "Detailed look at Ethereum Applications," Due, Apr. 1, 2016 [retrieved Apr. 4, 2017], https://due.com/blog/detailed-look-at-ethereum-applications/, 9 pages.
Schwartz et al., "Smart Oracles: A Simple, Powerful Approach to Smart Contracts," Codius, Jul. 17, 2014 [retrieved Feb. 5, 2018], https://github.com/codius/codius/wiki/Smart-Oracles:-A-Simple,-Powerful-Approach-to-Smart-Contracts, 13 pages.
Swanson, "Tradle," Github, https://github.com/tradle/about/wiki, Aug. 3, 2015 [retrieved Sep. 20, 2016], 4 pages.
Theymos et al., "Script," Bitcoin Wiki, http://web.archive.org/web/20160714165653/https://en.bitcoin.it/wiki/Script, Dec. 19, 2010 (archived version Jul. 14, 2016) [retrieved Mar. 14, 2019], 8 pages.
Third-Party Submission Under 37 CFR 1.290 filed Jun. 7, 2019, U.S. Appl. No. 16/097,218, filed Oct. 26, 2018, 17 pages.
Towns, "[bitcoin-dev] Let's deploy BIP65 Checklocktimeverify!," Linux Foundation, https://lists.linuxfoundation.org/pipermail/bitcoin-dev/2015-October/011473.html, Oct. 7, 2016 [retrieved Nov. 2, 2016], 1 page.
Tual et al., "IoT Interview Series: Decentralized Smart Devices with Stephan Tual from Slock.it," Postscapes, https://www.postscapes.com/iot-voices/interviews/smart-devices-ethereum-stephan-tual/, [retrieved Feb. 27, 2019], 8 pages.
UK Commercial Search Report mailed Jun. 13, 2016, Patent Application No. 1607472.6, filed Apr. 29, 2016, 5 pages.
UK Commercial Search Report mailed Oct. 19, 2016, Patent Application No. 1607569.9, 10 pages.
UK Commercial Search Report mailed Sep. 2, 2016, Patent Application No. 1607477.5, 7 pages.
UK Commercial Search Report mailed Sep. 26, 2016, Patent Application No. 1607538.4, 7 pages.
UK IPO Search Report mailed Dec. 22, 2016, Patent Application No. GB1607472.6, 6 pages.
UK IPO Search Report mailed Dec. 22, 2016, Patent Application No. GB1607538.4, 5 pages.
UK IPO Search Report mailed Dec. 22, 2016, Patent Application No. GB1607569.9, 6 pages.
UK IPO Search Report mailed Dec. 9, 2016, Patent Application No. GB1607477.5, 5 pages.
Watanabe et al., "Blockchain contract: A complete consensus using blockchain," IEEE 4th Global Conference on Consumer Electronics, Oct. 27, 2015, 3 pages.
Wattenhofer, "The Science of Blockchain," CreateSpace Independent Publishing Platform, https://www.yumpu.com/en/document/view/55701791/the-science-of-the-blockchain/95, Jan. 27, 2016 [retrieved Sep. 20, 2016], 8 pages.
Wikipedia, "Fredkin gate," Wikipedia the Free Encyclopedia, Nov. 26, 2018 [retrieved Feb. 27, 2019], https://en.wikipedia.org/wiki/Fredkin_gate, 3 pages.
Wikipedia, "Smart Contracts," Wikipedia the Free Encyclopedia, Jul. 24, 2015 [retrieved Jul. 20, 2020], https://en.wikipedia.org/w/index.php?title=Smartt_contract&oldid=672866135, 4 pages.
Wildling et al., "What OPCODES are available for the Ethereum EVM?," Ethereum Stack Exchange, Jan. 20, 2016 (retrieved Jul. 20, 2020), https://ethereum.stackexchange.com/questions/119/what-opcodes-are-available-for-the-ethereum-evm, 4 pages.
Xu et al., "The Blockchain as a Software Connector," 2016 13th Working IEEE/IFIP Conference on Software Architecture (WICSA), Apr. 5, 2016, 10 pages.
Zyskind et al., "Enigma: Decentralized Computation Platform with Guaranteed Privacy," arXiv preprint arXiv:1506, Jun. 10, 2015, 14 pages.
Nakamoto, "Bitcoin: A Peer-to-Peer Electronic Cash System," Bitcoin, Oct. 31, 2008, https://bitcoin.org/bitcoin.pdf, 9 pages.
Harding, "How do Bitcoin Miners Check for Double-Spend or Over-Spend?" https://stackoverflow.com/questions/30425272/how-do-bitcoin-miners-check-for-double-spend-or-over-spend, May 25, 2015, 2 pages.
Satoshi et al., "Connection Limits," Bitcoin Forum, Aug. 9, 2010, https://bitcointalk.org/index.php?topic=741.0;prev_next=prev, 2 pages.
User2223142 et al., "How do bitcoin miners check for double-spend or over-spend?," Stack Overflow, May 24, 2015, https://stackoverflow.com/questions/30425272/how-do-bitcoin-miners-check-for-double-spend-or-over-spend, 2 pages.
Wang et al., "IC Card-based Bitcoin Payment Design and Implement" International Conference on Intelligent Systems Research and Mechatronics Engineering (ISRME 2015), Atlantis Press, 2015, 4 pages.

* cited by examiner

| A | B | X |
|---|---|---|
| 0 | 0 | 0 |
| 1 | 0 | 1 |
| 0 | 1 | 1 |
| 1 | 1 | 0 |

FIG. 2

FIG. 9
A
B
Blockchain
(eg Bitcoin)
Transaction
X

IMPLEMENTING LOGIC GATE FUNCTIONALITY USING A BLOCKCHAIN

This invention relates generally to distributed ledger (blockchain) technology. This may be any blockchain-related technology, including (but not limited to) the Bitcoin Blockchain. Aspects of the invention relate also to the field of logic gates and combinatorial logic. The invention may be suited for use with a control system or process.

In this document we use the term 'blockchain' to include all forms of electronic, computer-based, distributed ledgers. These include consensus-based blockchain and transaction-chain technologies, permissioned and un-permissioned ledgers, side chain and alt chain technologies, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource.

A blockchain is a computer-implemented decentralised, distributed system made up of blocks which in turn are made up of transactions. Each transaction includes at least one input and at least one output. Each block contains a hash of the previous block so that blocks become chained together to create a permanent, unalterable record of all transactions which have been written to the blockchain since its inception. Transactions contain small programs known as scripts embedded into its inputs and outputs, which specify how and by whom the outputs of the transaction can be accessed. On the Bitcoin platform, these scripts are written using a stack-based scripting language.

In order for a transaction to be written to the blockchain, it must be 'validated'. Network nodes (miners) perform work to ensure that each transaction is valid, with invalid transactions being rejected by the network. Software clients installed on the nodes perform this validation work on an unspent transaction (UTXO) by executing its locking and unlocking scripts. If execution of the locking and unlocking scripts evaluates to TRUE, the transaction is valid and the transaction is written to the blockchain. Thus, an unlocking script can provide input for the evaluation of a locking script. While this is typically in the form of a signature-based input, other forms of input are known to be possible. Moreover, many of the commands in the scripting language are Boolean operators (e.g. OP-EQUAL) which provide a TRUE or FALSE result. This enables conditionality to be built into transactions.

The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations fall within the scope of the invention.

Blockchain technology is most widely known for the use of cryptocurrency implementation. However, in more recent times, digital entrepreneurs have begun exploring both the use of the cryptographic security system Bitcoin is based on, and the data that can be stored on the Blockchain, to implement new systems. The present invention relates to one such new and inventive adaptation of blockchain technology. In particular, it relates to the use of a blockchain to implement or emulate the functionality of logic gates which, in turn, can be used as simple yet effective and powerful mechanisms for the creating a wide and varied range of computer-implemented systems. Such systems can include control units for controlling processes and/or directing the behaviour of devices and systems.

The basic element of a control unit is the Logic Gate. By building gate logic into blockchain transactions (TXs) one could implement powerful processes which take advantage of the benefits conferred by blockchain technology. These benefits include, but are not limited to, enhanced cybersecurity, decentralised control, device/System/process control, potential integration with legacy systems; and immutability/permanency of records.

Thus, it is desirable to provide a solution which provides or emulates the functionality of a logic gate on or via a blockchain. In such a solution, logic gates could be implemented via the locking script of a blockchain Transaction. Extensions to the basic structure of logic gates could be provided to allow any number of inputs and any number of outputs. Such an improved solution has now been devised.

Thus, in accordance with the present invention there is provided a solution as defined in the appended claims.

Embodiments of the invention may provide computer-implemented method(s) and corresponding system(s). These may be described as control methods/systems.

Embodiments of the invention may be substantially in accordance with the section below entitled "Technique 1".

The method may comprise the step of providing a locking script in a first blockchain transaction.

The first (and/or further) transaction may be generated by an automated process i.e. by computer without human intervention.

The locking script may comprise at least one instruction arranged to process at least one Boolean input. The instruction(s) may be opcodes used in a blockchain protocol.

The at least one instruction in the locking script may be arranged and/or selected to implement the truth table of a logic gate. The logic gate may be an OR gate, XOR gate, NAND gate, NOR gate, a NOT gate, an XNOR gate, an IMPLY gate, or a Converse implication gate. Thus, the instruction(s) for the logic gate functionality may be selected by the programmer who writes the script.

The method may comprise the step of providing a further blockchain transaction having an unlocking script.

The at least one Boolean input may be derived or generated by testing or evaluating the solution to a blockchain puzzle. The term "puzzle" is known in the field of blockchain technology, and will be readily understood by the person skilled in the art.

The locking script may comprise a hash of a (redeem) script comprising the at least one instruction. Thus, the at least one instruction may be provided within the locking script in a hashed format.

The locking script may be a P2SH locking script as known in the Bitcoin protocol, or a functionally equivalent locking script in another blockchain protocol.

The method may comprise the step of processing at least one input signal to provide at least one Boolean input. The input signal may be received or derived from any source. It may be a source external to the blockchain.

The method may comprise the step of using the at least one Boolean input to execute the locking and unlocking scripts of the first and further blockchain transactions respectively.

The step of processing the at least one input signal to provide the at least one Boolean input may be performed by the unlocking script of the further blockchain transaction.

The method may comprise the step of transmitting the further transaction and/or first transaction to a blockchain network for validation. The network may be the Bitcoin network. Alternatively, validation of the further transaction may be performed without transmission of the transaction to the blockchain network. Successful validation/unsuccessful validation of the further transaction may be interpreted as a TRUE or FALSE value respectively.

The method may comprise the step of monitoring or searching the blockchain of network to determine the presence or absence of the further transaction. Presence or absence of the further transaction in the blockchain ledger may be interpreted as a TRUE or FALSE value respectively.

The method may comprise the step of providing a computing resource arranged to control or influence the behaviour of a device, system or process based upon detection of the further transaction within the blockchain.

The method may comprise the step of interpreting the validity of the further transaction as a TRUE output provided by a logic gate. Validity may be determined by a control agent, or by monitoring the blockchain and/or blockchain network.

Determination of the validity of the further transaction may serve as a trigger for an action to be performed by a computing agent.

Validation of the further transaction within the blockchain network may be dependent upon the execution of the unlocking script.

The method may comprise the step of controlling a device or process based upon the presence or absence of the further transaction within the blockchain. This may be any type of device, system or technical process.

The at least one input signal may comprise a numeric value, a constant value, a result of a hash function, a cryptographic key, a blockchain puzzle, and/or a Bitcoin other blockchain-related address.

The first and/or further transaction may be generated and/or transmitted to a blockchain network by an automated process executing on a computing-based resource.

The at least one instruction may comprise a Boolean condition, opcode or operator. It may be written and/or executed using a stack-based programming language.

The invention may also provide a method of using a blockchain to implement the functionality of an XOR logic gate, the method comprising the step of providing a blockchain transaction arranged to:

receive a plurality of input signals; and provide a first output when one, and only one, input signal enables the generation of a hash value which is equal to a stored data item.

Features mentioned in relation to the method described above may also apply to the version of the method described here.

The method may be arranged to implement the functionality of an XOR gate by executing a locking script in the blockchain transaction.

The first output may represent an output of the Boolean value TRUE.

In accordance with an alternative form of wording, the invention may be described as providing a method comprising the steps:

proving at least one input signal to the unlocking script of a Transaction input for a blockchain Transaction ($TX_2$), wherein the at least one input signal is a blockchain puzzle and is accompanied by one or more cryptographic signatures;

attempting to use the unlocking script of the blockchain transaction ($TX_2$) to spend an output of a previous blockchain transaction ($TX_1$) so as to cause the execution of the unlocking script of $TX_2$ and a locking script associated with the output of the previous transaction ($TX_1$);

processing the at least one input signal within the unlocking script of $TX_2$ to provide a Boolean value; and using the Boolean value to execute logic gate code which has been selected to emulate or perform the functionality of a chosen or predetermined logic gate.

The logic gate code may be provided in the locking script of $TX_1$; and/or the puzzle may represent a condition that evaluates to either true or false, and is evaluated during execution of the locking script by:

Using an unlocking script to present a solution or value for the puzzle to the locking script;

hashing the presented solution or value and then comparing the hash with a stored hash provided in the locking script;

interpreting equality of the hashes as "TRUE".

The invention may provide a computer implemented system arranged to implement any embodiment of a method as described above.

The invention may also provide a blockchain-implemented control system arranged to implement the functionality of a logic gate and operative to:

receive a plurality of input signals; and provide a first output when one, and only one, input signal enables the generation of a hash value which is equal to a stored data item.

Features mentioned in relation to the system described above may also apply to the version of the system described here.

The system may be operative to implement the functionality of a logic gate by executing a locking script in a blockchain transaction.

The logic gate may be an OR gate, XOR gate, NAND gate, NOR gate, an NOT gate, an XNOR gate, an IMPLY gate, a Converse implication gate.

It may be operative to:

derive a hash value for each of the inputs;

compare the hash value derived for each of the input signals with a stored hash value;

return a first value for each input signal in which the derived hash value is identical to a stored hash value;

return a second value for each input signal in which the derived hash value is not identical to a stored hash value;

determine the quantity of first values and issue the first output based on the determination.

The stored data item may be regenerated in response to the control system providing a first output. The stored data item may be regenerated in a random or pseudo-random manner.

A public key-private key pair may be generated for each stored data item.

Any feature described in relation to one aspect or embodiment may also be used in relation to another aspect or embodiment. For example, any feature describe in relation to the method may be applicable to the system and vice versa.

These and other aspects of the present invention will be apparent from and elucidated with reference to, the embodiment described herein.

An embodiment of the present invention will now be described, by way of example only, and with reference to the accompany drawings, in which:

FIG. 2 illustrates a truth table for the control system of FIG. 1;

Figure 15:
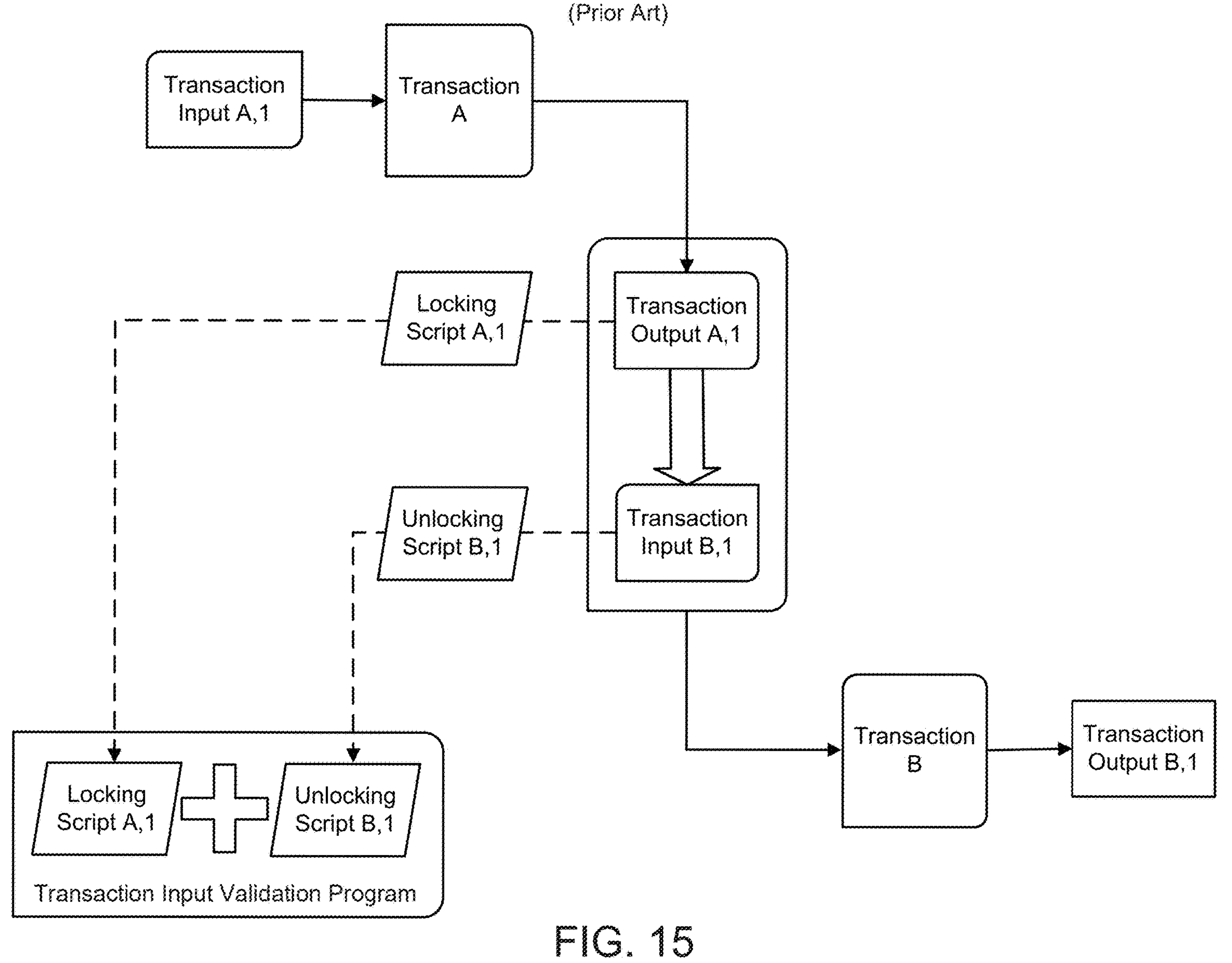

FIG. 15 provides an illustration of how locking and unlocking scripts are evaluated in accordance with the prior art.

Figure 9:
FIG. 9 shows the functionality of an illustrative embodiment of the invention in which two Boolean inputs A and B are evaluated within the unlocking script of a second transaction to produce a Boolean output X.
Figure 10:
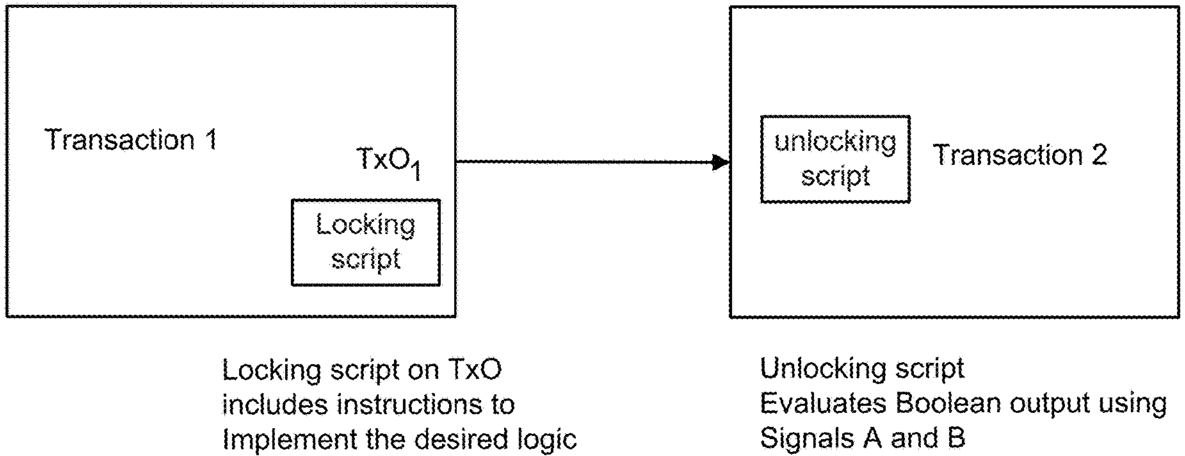
FIG. 10 shows an overview of an embodiment of the invention, comprising first and second transactions.

The invention provides a mechanism for using the locking script of a blockchain transaction to implement the logic of a particular truth table. As is known in the prior art, such truth tables are used to implement logic gates wherein typically a basic gate has two inputs, A and B and a single output, X. FIG. 9 shows an overview of the structure created by an illustrative embodiment of the invention in which two inputs A and B are evaluated within a transaction to produce an output X. The input values A and B are provided via an unlocking script of a blockchain transaction which attempts to spend the output of a previous transaction which is associated with the locking script containing the logic gate code. The unlocking script may, in one or more embodiments, comprise a redeem script. Thus, as shown in FIG. 10, at least two transaction are required to implement any embodiment of the invention. The first transaction locks an amount of bitcoin or other cryptocurrency with a locking script that embeds the gate logic. The second transaction spends the first transaction’s output by presenting A and B values (possibly along with a signature).

In the classical gate, A, B and X are binary, taking values equivalent to True (1) or False (0). However, in accordance with an embodiment of the invention, the classical gate is replicated and extended to include more complex variations. In particular, the inputs to the blockchain gate may not be ‘True’ or ‘False’ inputs per se but may be any of several different values, format or types of value. For example, A and B might be integers, hashed values, cryptographic keys, BTC-addresses, (etc.) and the truth value of A and B may be evaluated within the transaction in order to produce the output. The output is necessarily binary in the sense that the transaction may be valid (‘True’) or invalid (‘False’).

However, the output may serve any of several more complex functions. For example, it might represent a significant payment provisional on satisfaction of a set of conditions, or it might be a trivial payment but nevertheless act as a secure, permanent record of an event. Further examples of the variable usages of blockchain gates are provided below.

There are many different types of logic gates, all of which fall within the scope of the present invention. Generally speaking, there are several fundamental 2-input gates which are sufficient for the construction of any circuit. These are, in no particular order:

| | |
|---|---|
| 1. AND | |
| 2. OR | |
| 3. XOR | Exclusive OR |
| 4. NAND | Not AND |
| 5. NOR | Not OR |
| 6. XNOR | Exclusive NOR |
| 7. IMPLY | logical conditional |
| 8. NOT-IMPLY | Material Nonimplication |

Another commonly used gate is NOT, which has only one input; its output is the opposite value of the input. Gates are usually presented in the form of a ‘truth table’ that provides every possible combination of input values along with the associated output value. For example, table 1 shows the AND gate and the NOT gate.

TABLE 1

Truth table for an AND gate and a NOT gate

| AND | | | NOT | |
|---|---|---|---|---|
| A | B | X | A | X |
| 0 | 0 | 0 | 0 | 1 |
| 1 | 0 | 0 | 1 | 0 |
| 0 | 1 | 0 | | |
| 1 | 1 | 1 | | |

All eight foundational 2-input gates are shown in table 2.

TABLE 2 the 8 2-input gates

| A | B | AND | OR | XOR | NAND | NOR | XNOR | IMP | N-IMP |
|---|---|---|---|---|---|---|---|---|---|
| 0 | 0 | 0 | 0 | 0 | 1 | 1 | 1 | T | F |
| 1 | 0 | 0 | 1 | 1 | 1 | 0 | 0 | F | T |
| 0 | 1 | 0 | 1 | 1 | 1 | 0 | 0 | T | F |
| 1 | 1 | 1 | 1 | 0 | 0 | 0 | 1 | T | F |

In actuality, there are 16 possible different ways to draw the output column given two binary inputs, many of which might prove useful depending on the required application. These can each be created as a single gate. Thus, where truth tables are implemented by a single blockchain script (for example ‘technique 1’ below) any of the 16 possibilities can be coded within the transaction locking script. Of course some of the possibilities may have little or no real life application. For the sake of completion, the 16 possibilities for the first 6 gates are shown in table 3.

TABLE 3

| Every possible 2-input, 1-output 'gate' | | | | | | | | | | | | | | | | | |
|---|---|---|---|---|---|---|---|---|---|---|---|---|---|---|---|---|---|
| A | B | | AND | | | | | XOR | OR | NOR | XNOR | | | | | NAND | |
| 0 | 0 | 0 | 0 | 0 | 0 | 0 | 0 | 0 | 0 | 1 | 1 | 1 | 1 | 1 | 1 | 1 | 1 |
| 1 | 0 | 0 | 0 | 0 | 0 | 1 | 1 | 1 | 1 | 0 | 0 | 0 | 0 | 1 | 1 | 1 | 1 |
| 0 | 1 | 0 | 0 | 1 | 1 | 0 | 0 | 1 | 1 | 0 | 0 | 1 | 1 | 0 | 0 | 1 | 1 |
| 1 | 1 | 0 | 1 | 0 | 1 | 0 | 1 | 0 | 1 | 0 | 1 | 0 | 1 | 0 | 1 | 0 | 1 |

As previously stated, the present invention presents a solution in which blockchain Transactions are created to implement at least part of the functionality of a logic gate. This gate functionality is emulated within the locking script of the transaction. Such a locking script may be referred to for convenience herein as a 'blockchain gate' or 'bitcoin gate'. Also for convenience, Bitcoin may be referred to in the examples, although alternative blockchain protocols and platforms may be used.

It is noted that, in accordance with known techniques, blockchain transactions can be arranged to make use of an n of m multisig option. This, in effect, behaves as a logic gate in regard the number of signatures required on a transaction. Where n=m the multi-signature operation behaves as a logical AND gate. However, this is a limited implementation of a logic gate since it only relates to, or is only influenced by, the number of signatures supplied within an input and does not allow the evaluation of the blockchain-implemented logical gate to any other type of input. The invention, on the other hand, allows the gate functionality to operate on a wider set of parameterised input.

Figure 11:
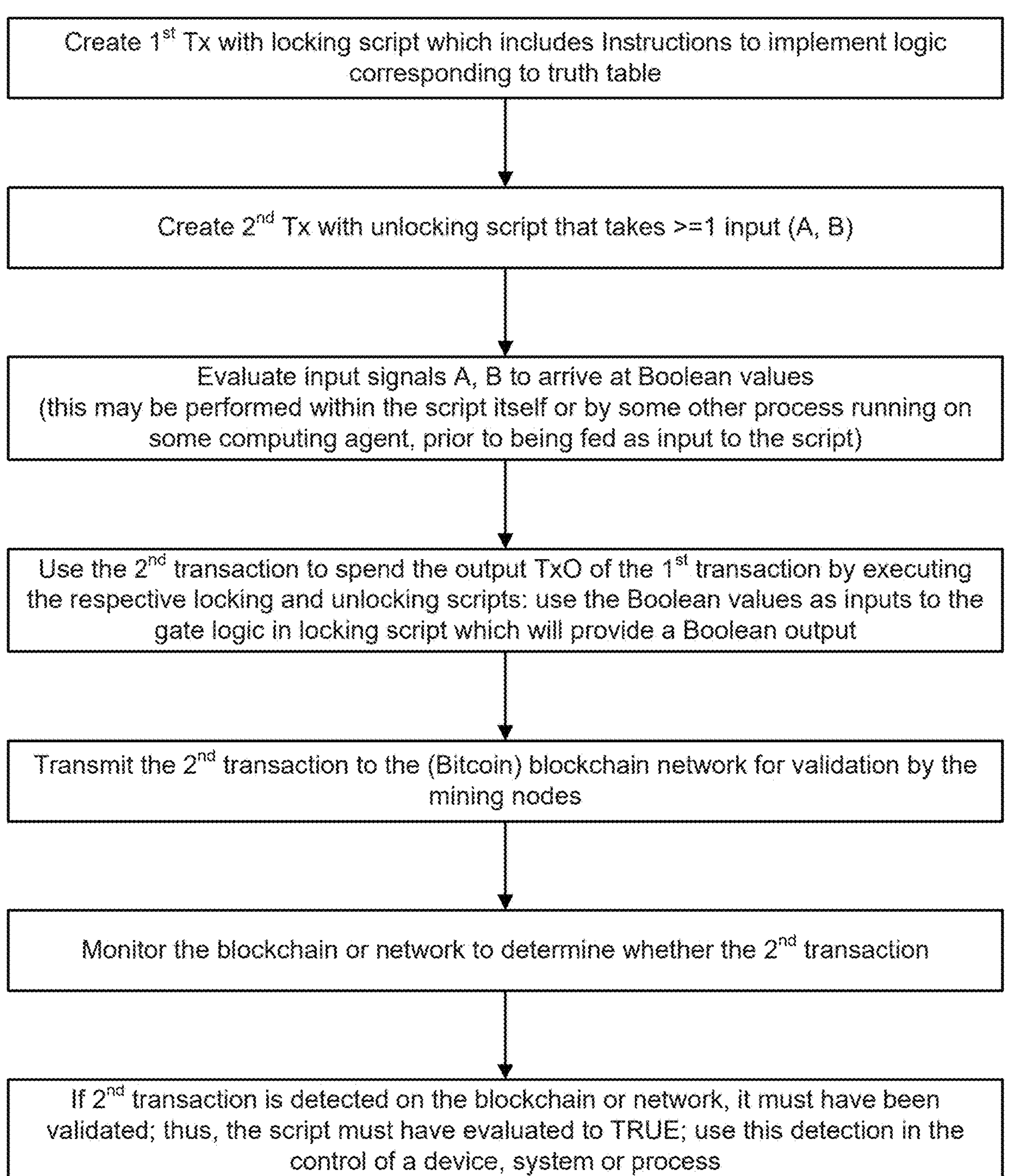
FIG. 11 illustrates a process in accordance with an embodiment of the invention.

In accordance with various embodiments of the invention, the locking script of a first blockchain transaction ($TX_1$) is used to provide the functionality of the chosen logic gate. In other words, as shown in the method of FIG. 11, the locking script provided within the first transaction contains some code which, when executed, will use the presented input value(s) to provide an output in accordance with the truth table of a particular logic gate. Thus, the instructions within the locking script are selected and arranged so as to implement the truth table of the desired gate. The locking script is associated with an output (TXO) of the first transaction.

A second transaction ($TX_2$) is then generated. The second transaction includes an input which comprises or is associated with an unlocking script. The unlocking script may be used to unlock the locking script of the first transaction so as to spend the output (TXO). Validation causes the locking and unlocking scripts of the first and second transactions to be executed. Thus, specific values for A and B will be used. See FIG. 15 for an illustration of how locking and unlocking scripts are evaluated during transaction validation, as known in the prior art.

If execution of the locking and unlocking scripts results in a valid transaction, the validity of the transaction can be interpreted as a TRUE output of the logic gate. Conversely, if validation of the transaction fails, this can be interpreted as a FALSE output from the logic gate. This is an enhancement over the prior art, as in accordance with known blockchain techniques and technologies a failed script is simply just that. In accordance with the present invention, however, a failed script (ie unsuccessful validation) enables the detection of, and subsequent response to, "false" inputs. Thus, the invention enables derivation and initiation of meaningful subsequent behaviour irrespective of whether the inputs are true or false, because some course of action is dependent upon the output of the blockchain gate, whatever that output happens to be.

Validity of the transaction can be determined by:

- the computing agent
- one or more nodes on the blockchain network
- detection of the transaction within a block on the blockchain. As described above, when the second transaction is presented to the (Bitcoin) network in order to try to spend an output from the first transaction, the mining nodes will perform their validation duties. If the transaction is valid, it can be written to the blockchain, otherwise it will be rejected. Thus, a computing agent can monitor the state of the blockchain to determine whether that transaction has made it out to the ledger. If it is detected in the blockchain, this must mean that the transaction was valid. This can be interpreted by the computing agent as a TRUE output from the logic gate.

Establishment of validity or invalidity may serve as a trigger for the performance of some action. This action may be performed by an agent. It may control or influence the behaviour of a device, a system, or a process.

Figure 12:
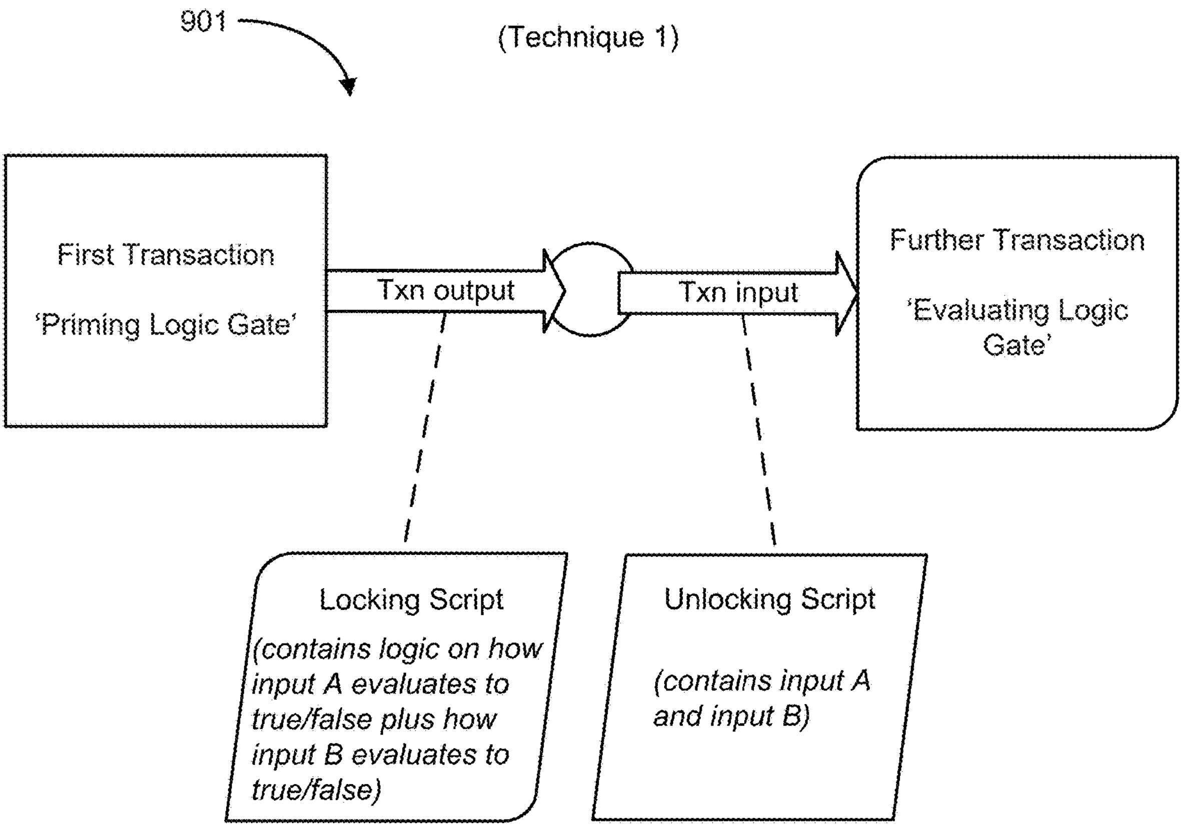
FIG. 12 shows an overview of an embodiment in accordance with “technique 1” of the invention as described below.
Figure 13:
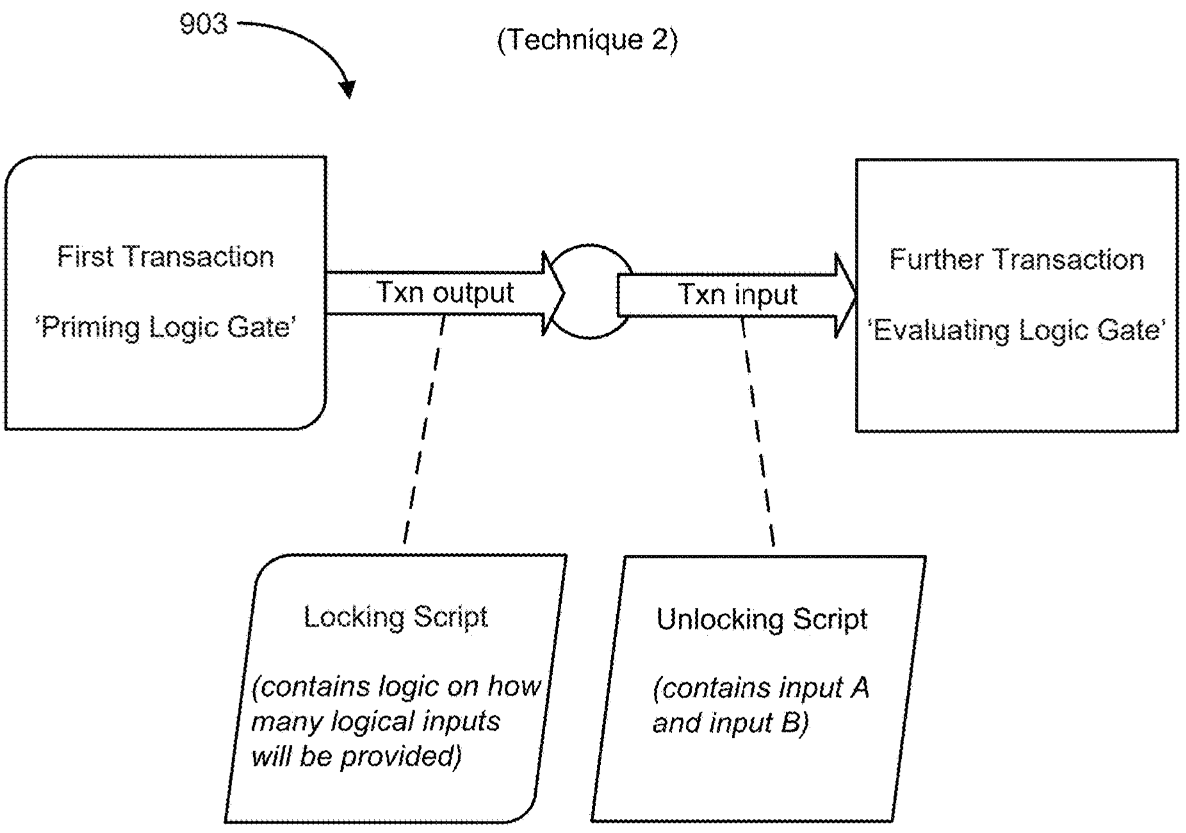
FIG. 13 shows an overview of an embodiment in accordance with “technique 2” of the invention as described below.
Figure 14:
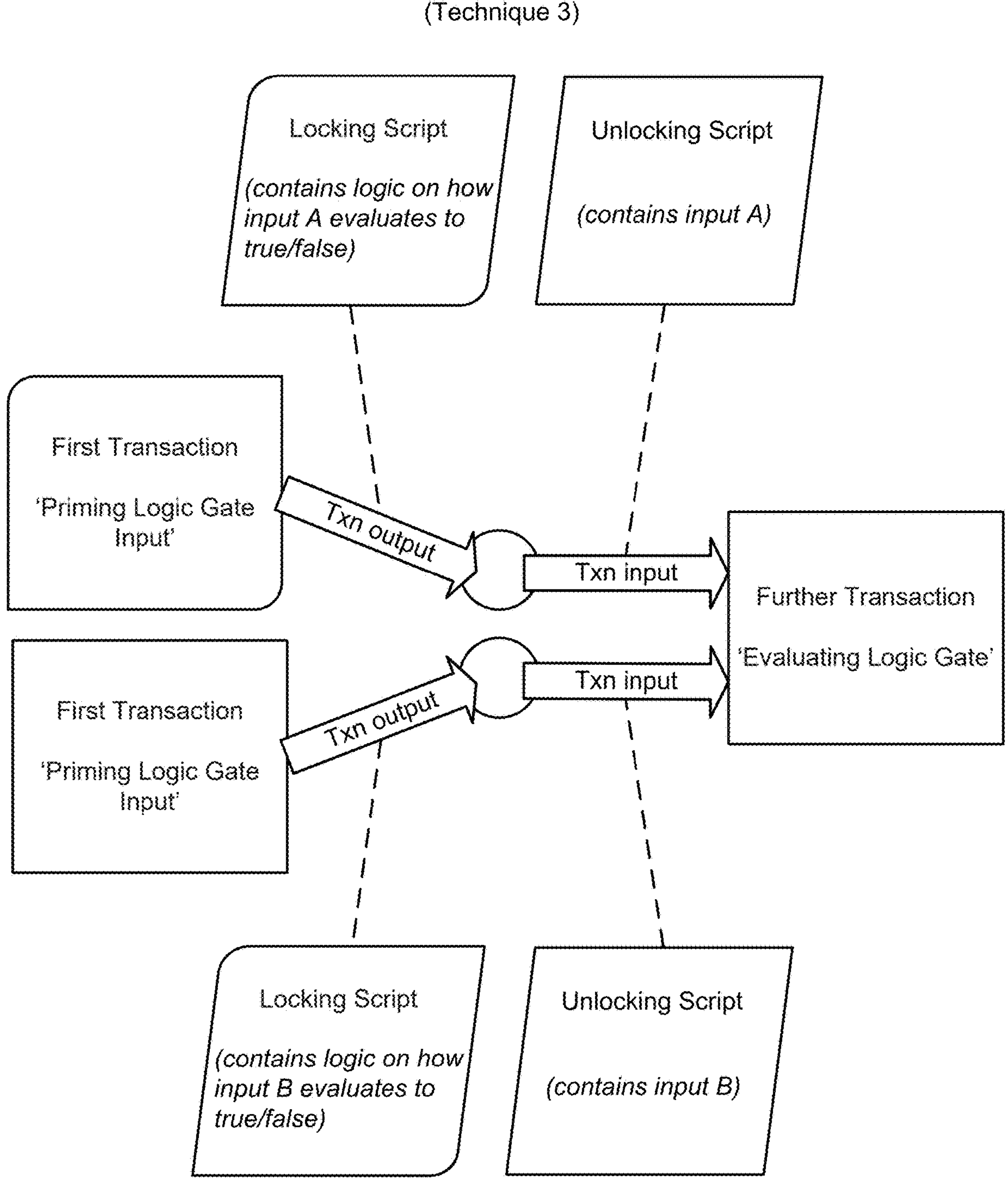
FIG. 14 shows an overview of an embodiment in accordance with “technique 3” of the invention as described below.

As shown in FIGS. 12, 13 and 14, the first transaction ($TX_1$) may be referred to as a "priming logic gate" in that it defines the functionality of the gate that is to be emulated. The second transaction ($TX_2$) may be referred to as an "evaluating logic gate" as it provides, via an unlocking script, the values which will be used in the evaluation of the gate output.

There are various techniques for achieving the above, as set out below and with reference to FIGS. 10 to 14.

Technique 1

An illustrative embodiment of the invention is provided in FIG. 12. Key defining attributes:

- Input signals A and B are provided to the unlocking script of a Transaction input for a single Transaction ($TX_2$);
- A and B are '(bitcoin) puzzles' and may be accompanied by one or more signatures
- The unlocking script of $TX_2$ is used to try to spend the output of a previous transaction $TX_1$, this causes execution of the unlocking and locking scripts of $TX_2$ and $TX_1$ respectively
- A and B are processed within the unlocking script of $TX_2$ to evaluate to True/False;
- the relevant logic ie code for the chosen gate (provided in the locking script of $TX_1$) is then executed using those processed values;
- Script evaluation then performs other logic and instructions, such as multisig; note that the mutlisig operation, as known in the art, is distinct from, and performed after, the execution of the code for the chosen logic gate Each puzzle represents a condition that is either true or false and is evaluated during execution of the locking script by:

- first presenting a solution i.e. value for the puzzle to the locking script via an unlocking script the locking script hashes the presented value and then compares it with an internally stored hash value ("internally stored" meaning that the hash has been written in as part of the locking script). Equality of the hash of the presented value and the stored hash means 'True' while inequality means 'False'; Thus, for each puzzle, comparison of the hashes provides an intermediate result the intermediate results of the two evaluated conditions are then applied to the relevant gate logic code provided within the locking script to provide a final result which represents output X of the logic gate. If the final result is True then the accompanying signatures are verified using a multisig operation.

The locking script of $TX_1$ may be a P2SH locking script as known in the Bitcoin protocol, or a functional equivalent from an alternative protocol. In accordance with known techniques, the P2SH locking script includes the hash of a redeem script and the $TX_1$ output can only be spent upon presentation of the correct script which, when hashed, matches the hash stored in the locking script. Thus, in respect of a pay-to-script hash transaction, the actual logic is presented within the unlocking script; although the locking script 'knows' the logic that will be supplied subsequently. As the skilled person will understand, while the behaviour of the locking script in such a transaction must be known, using cryptographically secure techniques the actual instruction set can be provided as part of the unlocking script. An advantage of this approach is that the content of the redeem script or the stored hash cannot be discerned because in practice the solution is presented via the redeem script as an initial hash, which is then hashed again during execution of the locking script in order to perform the comparison. Thus, privacy and security can be enhanced or maintained.

In another variation, the A and B values might not be hashed and, rather than testing for equality between hashes, another test is applied to derive True and False. For example, A might be the current Dow Jones index and the script might test for A>(some-predetermined-threshold). This approach would not use the P2SH transaction type to compare hashes so as to arrive at the intermediate results for A and B but would, instead, use "condition evaluation code" in the locking script to evaluate some other type of predetermined condition. In this way, many different kinds of conditions may be tested for True/False. The intermediate results from the condition evaluation code may then be passed to the gate logic portion of the locking script and finally to the signature verification. The signature verification process is performed in accordance with known techniques in the art. It should be noted that in this particular case, as the values of A and B are not hashed, the method is not suitable if the conditions being tested are required to be kept secret.

Technique 2

An overview of technique 2 is provided in FIG. 13. Key defining attributes:

Inputs A and B are included in an unlocking script and presented to the locking script of a single Transaction input (e.g. by a Control Agent)

A and B are 'True' or 'False' and may be accompanied by a signature

The conditions represented by A and B were pre-evaluated outside the Transaction by dedicated, computer-based Agents to derive the True/False values and then securely transmitted to a Control Agent The Control Agent creates the further Transaction which includes the unlocking script, presenting the A and B values (plus a signature) to the locking script Thus, technique 2 is the same as technique 1, except that the conditions are evaluated by computing Agents prior to their presentation to the unlocking script. As with technique 1, the code which emulates the logic gate functionality is provided in the locking script of the first transaction, and the actual values for the input(s) are provided during validation via the unlocking script of the further transaction.

Technique 3

An overview of technique 3 is provided in FIG. 14. Key defining attributes:

A and B are presented to the locking scripts of two separate Transaction inputs (for the same Transaction)

A and B are '(bitcoin) puzzles' and may be accompanied by a signature

Using the relevant combinations of SIGHASH flags (e.g. ANYONECANPAY), two separate Agents present A and B separately to the Transaction template (which is eventually finalised by a Control Agent)

A and B are evaluated to True/False within each locking script which then performs the relevant gate logic Each script then performs other logic, such as signature checking in accordance with the prior art For the overall Transaction to be valid, each input must be valid. This implements the AND truth table. The same technique can be used for any number of inputs. I.e., instead of evaluating two conditions, A and B, any number of conditions A, B C, . . . can be set as a requirement for creating the Transaction.

Template Transactions

In one or more embodiments, Transaction templates may be provided which are copied and then populated with A and B inputs to create a Transaction that may be broadcast to the blockchain network. If the broadcast Transaction is accepted as valid by the network, this may be interpreted as an output of 'True' as described above, but also serves to provide a permanent, non-alterable record on the blockchain. A and B usually represent conditions which can be evaluated as True or False. Any kind of condition may be evaluated, and any kind of data can be used in order to evaluate the condition. For example, the condition may involve events in the real world, the receipt or absence of a signal, the successful completion of a calculation etc. Although the list is limitless, the following represent a very small indicative sample of the different types of conditions that might be tested.

Example Conditions that Might be Tested for True/False for Use in a Blockchain Gate:

1. The current date is 30 Jun. 2025
2. The $1,000,000^{th}$ bitcoin Block has been reached
3. An entity has sent a coded signal (e.g. Bob just said 'GO!' to spending a Transaction)
4. The temperature in location X is below Y° C.
5. The Dow Jones index is currently above 20,000
6. The person identifiable as Juanita Shalala Morgensen-Smythe has just got married
7. (etc.)

The blockchain gate may be created by any entity. However a preferred embodiment is to set up one or more automated software Agents to perform the functions associated with the creation, maintenance and transmission of blockchain gates. The term 'automated' may be taken to mean that it is performed entirely by the execution of a program, without manual intervention to complete the task. In a preferred embodiment, these Agents are capable of performing a variety of functions, of which only a sample is listed below.

Example Functions which May be Performed by Agents in Relation to Blockchain Gates 1. Monitor events in the real world and perform certain actions according to set rules once a 'trigger' is detected
2. Monitor the Blockchain for triggers and perform certain actions according to set rules once a 'trigger' is detected
3. Take copies of the Transaction templates and populate them with inputs and/or outputs based on set rules, and broadcast the Transaction to the blockchain network
4. Perform other types of action, when triggered, such as send alerts to interested parties, or communicate with other Agents to send or receive data, etc.

There are many potential applications for implementing logic gates in blockchain Transactions. The details of how gates or combinations of gates would be created and deployed to implement applications are beyond the scope of the present document. However, the invention could be used, for example, in the control of electronic devices. This could include IOT (Internet of Things) devices, such as: Alarm systems; Vehicle unlocking systems; Appliance switches; Wireless Sensor Networks; SCADA (Securely); Plant Controls; Inverters; Transaction locking system; Time based Safe; Watering System; (etc). It could also be used for the development of automatic payment systems and calculations. For example:

a. If payment is received on time then send to output 1, else send to output 2 and calculate amounts and interest separately
b. An ANYONECANPAY blockchain transaction that increases or decreases over time Some Possible Variations of 'Gates' to be Used in Blockchain Transactions 1. A and B might be binary (as in the classical gate). X might be binary in the sense that the Transaction is either 'True' (valid) or 'False' (not valid).
2. A and B might be cryptographic signatures.
3. A and B might be any number, representing a meaningful value. For example, a date.
4. A and B might be the hash of a meaningful value
5. A and B might be 'puzzles' in the bitcoin sense (the solution to a particular hash)
6. A and B might be a combination of two or more of the above (e.g. signature+puzzle)
7. A and B might be of different types (for example, A=signature+meaningful value; B=puzzle)
8. There might be multiple inputs, A, B, C,
9. X=True (valid) might mean that a third party is paid some bitcoins. For example, when certain conditions are satisfied as represented by A and B and the gate logic then pay bitcoins to a beneficiary
10. X=True (valid) might mean that the output bitcoins are simply returned to the payer, and the purpose of the Transaction is unrelated to payments (examples below).
11. X=True (valid) might mean trigger an event (for example, a monitoring Agent might be triggered to take a set action such as control an IOT device)
12. X=True (valid) might mean register an event, that is, the Transaction's purpose is to act as a secure, immutable permanent record of an event.
13. There might be multiple outputs, X, Y, . . . . This might mean several beneficiaries are paid bitcoins, or several triggers are enacted, or a combination.
14. There might be a single Transaction that in and of itself implements a gate; this is done within a locking script.

Example Implementation of an Embodiment of the Invention

In this illustrative example, we use a locking script to implement the functionality of an XOR gate which is used in a device control application.

A Blockchain IOT Device (BID) is a computing Agent that is set up to execute predetermined instructions which are stored securely off-BID and accessed via cryptographic keys. By 'off-BID' we mean that the instructions are not provided within the BID itself, but are stored elsewhere and accessed as and when required. These instructions are selected and arranged to perform a chosen task or plurality of tasks. When executed, the instructions can control and influence the behaviour of the IOT device. The BID may reside on the IOT itself, meaning that the BID is installed in memory provided in or on the IOT device. However, in other embodiments the BID may reside off-device and have internet connectivity to the device.

The IOT device has its own cryptographic key (as well as an IP address) so it can securely communicate and interact with other devices or DHTs, etc. Its 'operating system' is a simple, generic system with some embedded functionality for (at least, but not limited to):

cryptographic calculations retrieving instructions from an external source (such as a DHT)

performing simple actions such as toggling switches (i.e. as on the physical IOT device)

Thus, neither the IOT device or its associated BID contain their own built-in instructions and neither 'knows' what it does or how to do it. The BID only contains a mechanism for securely retrieving instructions from elsewhere. A BID can only perform a set of simple actions (the following are illustrative only and not limiting):

Access to its own master private and public key pair; it also has its own (derivable) BTC address.

Ability to send data to an IP address or receive data from an IP address

Secret Sharing protocol calculations (as described below)—in a preferred embodiment these may be embedded in machine code Look up and interpret Blockchain events Operate and control the physical device it is attached to (via a standard API that is essentially just a set of switches)

The BID's incoming and outgoing communications are encrypted using a security mechanism as described below, which enables keys to be created using shared secrets. This allows:

(i) greater security from 'hacking'
(ii) simple universal software upgrade protocols
(iii) device agnosticism This embodiment of the invention provides, therefore, a generic operating system which is usable in any IOT device. The device itself is not programmed—all programs are stored separately and loaded into the device at set-up time (or, in some embodiments, at execution time).

Figure 1:
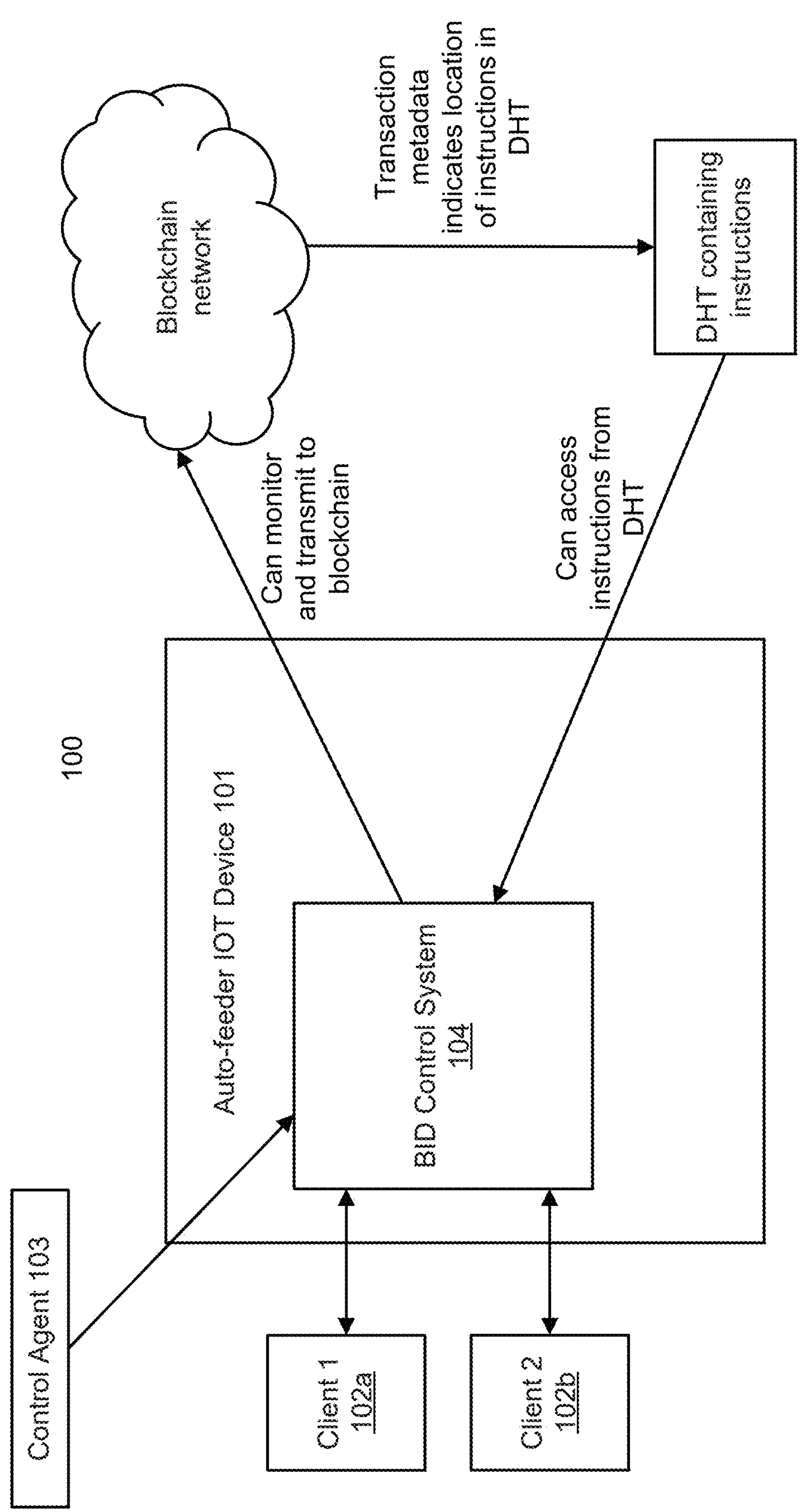
FIG. 1 illustrates a system configured in accordance with an embodiment of the invention and in relation to an illustrative use case.

Turning to FIG. 1, system 100 comprises first and second client devices, respectively enumerated as 102*a* and 102*b*, and a BID control system 104 which is operative to receive inputs from the first 102*a* and second 102*b* client devices and to transmit information to first 102*a* and second 102*b* client devices. In this example use case, first and second client devices 102*a*, 102*b* are radio frequency identification devices (RFIDs) which are detectable by BID control system 104. Control system 104 is operative to use a blockchain and is operative to transmit outputs to a blockchain.

We will describe how control system 104 works using an example of Carol's two dogs, named Archimedes (A) and Bertrand (B), who are left alone all day in the back yard and they are both friendly to each other provided they do not eat at the same time, which for some reason causes them to become aggressive and fight each other. A and B both have identifying RFID collars i.e. first RFID collar 102*a* and second RFID collar 102*b*, which are detectable by an Internet Of Things (IOT) device 101. This IOT device is an auto-feeder which dispenses specified quantities of food for consumption by one of the dogs, i.e. the BID control system 104 controls the operation of the IOT feeding device.

In this example, the BID 104 is a software resource or component which is provided on the IOT auto-feeder and interfaces with the feeder to control its functions.

The BID begins its life by downloading and installing its instructions from the DHT. It does not need to do this again until those instructions are modified. This might be, for example, when the BID needs to be upgraded or when the BID's behaviour is to be completely modified e.g its instruction set might be modified to detect three or more RFID signal.

The Control Agent uses the values transmitted by the BID to create a blockchain transaction, and also shares new secrets with the BID after each iteration as explained below.

The functionality of the BID control system 104 is implemented using a blockchain transaction which is locked using the locking script:

OP_HASH160 <unlocking script hash>OP_EQUAL

Transactions are created to provide (via metadata linking to a distributed hash table (DHT)) a set of instructions to control the IOT auto-feeder device and may include instructions to a computing resource established in accordance with what is described below. The metadata can include a pointer or reference to a location where the instructions can be accessed, rather than storing the instructions within the transaction itself. Thus, the instructions may be held 'off-block'.

The Blockchain provides not only a mechanism for controlling activities but also to record information about events that have taken place e.g. it provides the ability to count the number of feedings, what time they occurred, which dog ate, whether maximum food allocation has been dispensed, etc. It also provides cryptographic security.

An important function of the transaction is to ensure that food is dispensed only if one dog is present at the feeder at the same time. Therefore, some conditionality needs to be built into the transaction's script. This is achieved with an XOR function as per the truth table illustrated in FIG. 2:

- if neither A nor B are at the feeder, do not dispense food
- if A is at the feeder but not B, dispense food;
- if B is at the feeder but not A, dispense food;
- if both A and B are at the feeder, do not dispense food.

When A or B are at the feeder an RFID signal is transmitted to the auto-feeder's control system 104, from the respective client device, i.e. first RFID collar 102*a* or second RFID collar 102*b*, to unlock that dog's secure current puzzle solution (which is securely replaced with a new puzzle solution after each iteration). If A or B are not at the feeder, a random number is instead transmitted from the respective RFID collar to the feeder. In other words, a dog being 'at the feeder' means its RFID collar is within detectable range of the feeder. If this is the case, the relevant puzzle is unlocked for transmission. If not, the default is a random number.

A puzzle solution is data which, when hashed, results in a value that provides a match when compared with the stored value within a (bitcoin) script. That is, the process is: a secret value (the 'solution') is hashed and stored within a script for later comparison. To unlock the script the secret is presented to the script, which first hashes the presented value and then compares it with its stored hash. If the comparison determines that they are equal then the result of the comparison is 'TRUE'. In practice, the stored value is the DOUBLE-hash of the secret, and the value presented is a SINGLE-hash of the secret. This enables any length of secret to be reduced to a standard manageable size for input to the script (i.e. always 160 bits long).

The Auto-feeder BID executes its instructions which were retrieved from a DHT using a look-up key that is related to the BID's key/pair. The Control Agent manages the data flow to/from the BID (i.e. data relating to the RFID signals, not related to the BID's instruction set). Thus, the Auto-feeder BID monitors its own state. It stores two secret values (S1 and S2) received from the separate Control Agent 103. The Control Agent 103 can be a suitably programmed computing resource arranged to oversee the feeding process. The secret values S1 and S2 are used conditionally when the dogs' RFID collars are detected within range. Based on its instructions as retrieved from the appropriate DHT, on detection of an RFID within range (along with other conditions related to the time of day; number of previous feedings; other restrictions; etc.) it sends a signal to a Generic Agent acting as its Control Agent (see below). The signal includes:

- S1 (=Puzzle-A-Solution) if Archimedes' RFID is detected else Random Number
- S2 (=Puzzle-B-Solution) if Bertrand's RFID is detected else Random Number The Auto-Feeder BID then:

- The Autofeeder checks the validity of the transaction or, in some embodiments may check for a valid transaction on the network (which may or may not yet be published on a Block, but in any event which must be a valid transaction). This transaction is created and broadcast by the Control Agent. It is valid if the embedded XOR test has passed. If not passed, then it will be invalid and will not be propagated beyond the first "hop" on the blockchain network. Thus it will not be detected by the BID. Or, if the BID is on the first hop and therefore the transaction is detected, part of the BID's function (as for any other node) is to validate the transaction. So it will be able to detect if the transaction is valid before it takes it consequent action. The valid transaction also guarantees that the required information has been stored and recorded on the blockchain i.e. regarding the feeding event.
- If the above answer is TRUE then the BID performs its conditioned instruction—in this case, it dispenses some food
- Receives a transmission from the Control Agent 103 enabling it to share two secrets (S1 and S2, as per below) and internally updates these secret values ready for next iteration.

The locking script for the Bitcoin transaction is given by:

OP_HASH160 <Puzzle-A> OP_EQUAL OP_SWAP
OP_HASH160 <Puzzle-B> OP_EQUAL
OP_NUMEQUAL OP_NOT OP_VERIFY
OP_1 metadata1 PubK-Carol OP_2 OP_CHECKMULTSIG Where:

Puzzle-A is the equivalent result of OP_HASH160 (Puzzle-A-Solution)

Puzzle-B is the equivalent result of OP_HASH160 (Puzzle-B-Solution)

Metadata1 Contains a reference to codified instructions stored in a DHT.

PubK-Carol is Carol's public key

Note that the Agent's programming may be hard coded or it too may retrieve its own instructions from a DHT. The codified instructions may be stored and accessed in accordance with the procedure set out below for referencing a contract from a blockchain transaction using metadata. Carol's public key may be securely held or recreateable using the process set out below.

In order to unlock the illustrative blockchain transaction shown above, the following script will be required:

Sig-Carol Puzzle-B-solution Puzzle-A-Solution <unlocking script>

Figure 3:
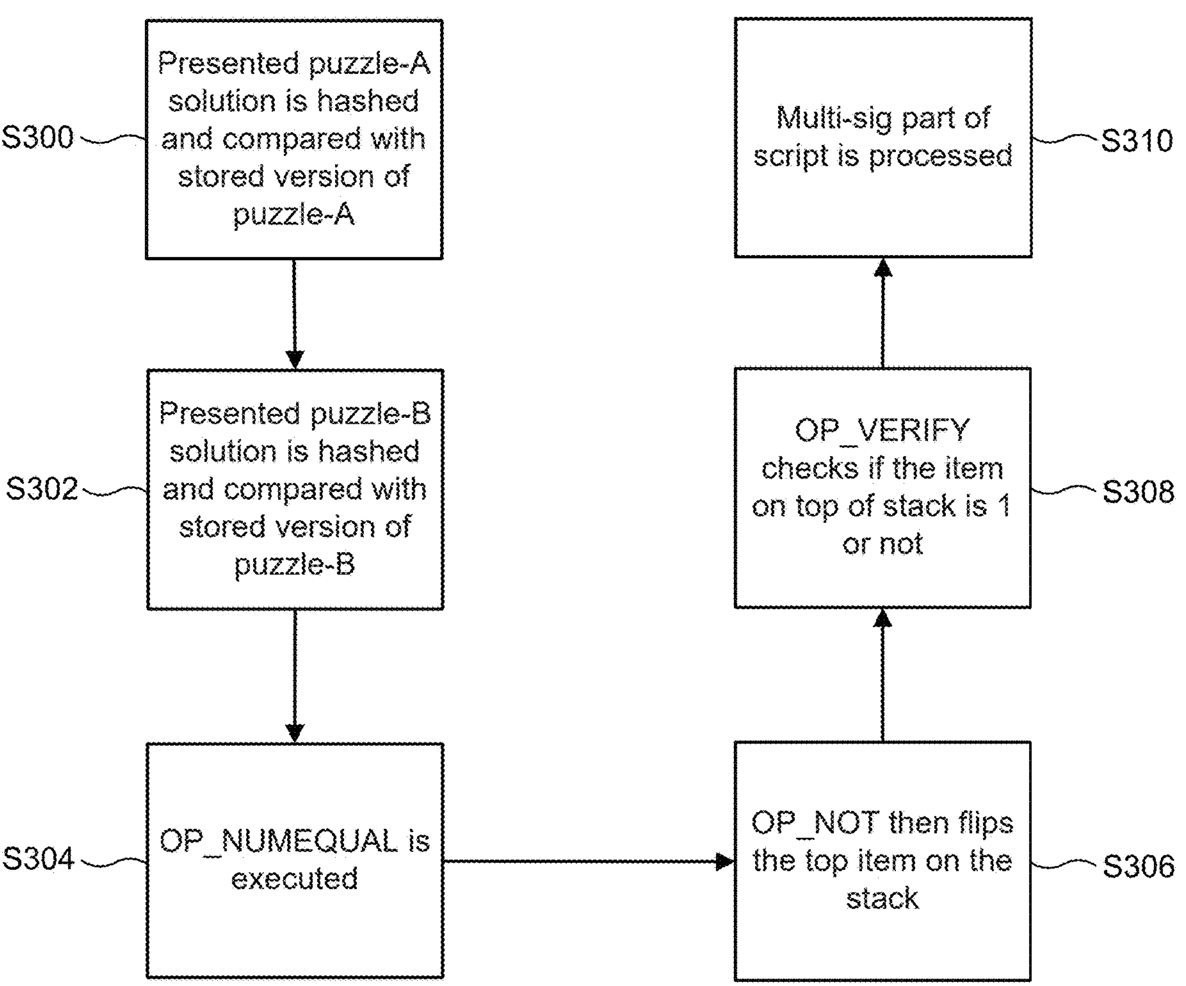
FIG. 3 illustrates the steps in the processing of the unlocking transaction for the example of FIG. 1.

We refer to FIG. 3 for an illustration of the following steps.

Control system 104 is operative to hash the presented puzzle-A solution and compare it with a stored version of puzzle-A (in which the version is a hash of the solution) that is retrieved from storage in step S300. The stored version of puzzle-A may be stored in storage local to the control system 104 or on any other suitable storage medium. If they are equal then the top of stack=1 and if they are different the top of stack=0.

The top of stack is then swapped with the second item on the stack which is puzzle-B solution in a step S302. This is hashed and compared with a stored version of puzzle-B which is retrieved from storage, again pushing 1 or 0 onto the top of the stack in a similar vein to the outcome from S300. The stored version of puzzle-B may be stored in storage local to the control system 104 or on any other suitable storage medium.

At this point the top two stack items are each either 0 or 1. In step S304 OP_NUMEQUAL then returns 1 if the numbers are equal, 0 otherwise, which is the exact reverse of the XOR truth table.

In step S306, OP_NOT then flips the top item on the stack to produce the required XOR result.

In step S308, OP_VERIFY then checks if the item on the top of the stack is 1 and if not, i.e. if the XOR operation has failed, the transaction is immediately marked as invalid as more than a single input from the first and second client devices has returned a matching puzzle solution. The result of this is that no food is dispensed from the IOT dispenser as more than a single dog is at the IOT dispenser. That is to say, the output of the control system 104 is controlled by the execution of the underlying Bitcoin transaction.

If OP_VERIFY returns 1 then the processing in control system 104 returns to the multi-sig part of the script where the presence of the signature of Carole is checked in step S310.

The stack operations performed by control system 104 in analysing the unlocking script are shown below. Firstly, control system 104 hashes the unlocking script to compare the hash with the hash of the unlocking script using OP_EQUAL. Following this, the unlocking script is then executed.

| Stack | Script | Description |
|---|---|---|
| Empty | Sig-Carol Puzzle-B-solution Puzzle-A-Solution OP_HASH160 <Puzzle-A> OP_EQUAL OP_SWAP OP_HASH160 <Puzzle-B> OP_EQUAL OP_NUMEQUAL OP_NOT OP_VERIFY OP_1 metadata1 PubK-Carol OP_2 OP_CHECKMULTSIG | |
| Sig-Carol Puzzle-B-solution Puzzle-A-Solution | OP_HASH160 <Puzzle-A> OP_EQUAL OP_SWAP OP_HASH160 <Puzzle-B> OP_EQUAL OP_NUMEQUAL OP_NOT OP_VERIFY OP_1 metadata1 PubK-Carol OP_2 OP_CHECKMULTSIG | data added to the stack |
| Sig-Carol Puzzle-B-solution Puzzle-A-Solution-hashed | <Puzzle-A> OP_EQUAL OP_SWAP OP_HASH160 <Puzzle-B> OP_EQUAL OP_NUMEQUAL OP_NOT OP_VERIFY OP_1 metadata1 PubK-Carol OP_2 OP_CHECKMULTSIG | The top stack item is hashed |
| Sig-Carol Puzzle-B-solution Puzzle-A-Solution-hashed <Puzzle-A> | OP_EQUAL OP_SWAP OP_HASH160 <Puzzle-B> OP_EQUAL OP_NUMEQUAL OP_NOT OP_VERIFY OP_1 metadata1 PubK-Carol OP_2 OP_CHECKMULTSIG | The given hash (puzzle-A) is pushed to the top of the stack |
| Sig-Carol Puzzle-B-solution FALSE | OP_SWAP OP_HASH160 <Puzzle-B> OP_EQUAL OP_NUMEQUAL OP_NOT OP_VERIFY OP_1 metadata1 PubK-Carol OP_2 OP_CHECKMULTSIG | The top two items are compared and the result (FALSE) pushed to the top of the stack |

-continued

| Stack | Script | Description |
|---|---|---|
| Sig-Carol FALSE Puzzle-B-solution | OP_HASH160 <Puzzle-B> OP_EQUAL OP_NUMEQUAL OP_NOT OP_VERIFY OP_1 metadata1 PubK-Carol OP_2 OP_CHECKMULTSIG | The two top stack items are swapped |
| Sig-Carol FALSE Puzzle-B-solution-hashed | <Puzzle-B> OP_EQUAL OP_NUMEQUAL OP_NOT OP_VERIFY OP_1 metadata1 PubK-Carol OP_2 OP_CHECKMULTSIG | The top stack item is hashed |
| Sig-Carol FALSE Puzzle-B-solution-hashed <Puzzle-B> | OP_EQUAL OP_NUMEQUAL OP_NOT OP_VERIFY OP_1 metadata1 PubK-Carol OP_2 OP_CHECKMULTSIG | The given hash (puzzle-B) is pushed to the top of the stack |
| Sig-Carol FALSE TRUE | OP_NUMEQUAL OP_NOT OP_VERIFY OP_1 metadata1 PubK-Carol OP_2 OP_CHECKMULTSIG | The top two items are compared and the result (TRUE) pushed to the top of the stack |
| Sig-Carol FALSE | OP_NOT OP_VERIFY OP_1 metadata1 PubK-Carol OP_2 OP_CHECKMULTSIG | The top two numbers (0 or 1) are compared and the result (FALSE) pushed to the top of the stack |
| Sig-Carol TRUE | OP_VERIFY OP_1 metadata1 PubK-Carol OP_2 OP_CHECKMULTSIG | The top stack item is flipped (from FALSE = 0 to TRUE = 1) |
| Sig-Carol | OP_1 metadata1 PubK-Carol OP_2 OP_CHECKMULTSIG | Top stack item is verified. As it is TRUE, the transaction is not (yet) marked invalid and the script continues |
| TRUE | Empty | Multi-sig is checked and passes. |

We now illustrate another example of how a bitcoin transaction can be used to implement the functionality of an XOR gate.

Bob sees an upward trend in the shares of company XYZ and decides that if the trend continues he will buy. Therefore, he sets a threshold value of the share price at which he will buy in if the price reaches above this value (in his mind this will be confirmation that the upward trend is real and will continue).

Alternatively, he wants to enter the market when the overall market is low, so even if the value of the XYZ shares are below his set threshold, he decides that when the market-index falls below another threshold this would be an alternative trigger to buy XYZ.

However, he does not want to buy XYZ if both of these conditions hold true, i.e. if the threshold value is exceeded and the market index falls below the defined threshold. This is because (in his mind) the combination of a low overall market plus XYZ shares reaching his threshold actually indicates that the share price is about to fall.

The actual value (as opposed to the truth value) of inputs A and B are as follows:

Input A=the current price of XYZ shares

Input B=the current market index value

The truth values, i.e. the respective threshold values of A and B, are as follows:

A>$32.08/share evaluates to True

B<5320.01 evaluates to True

In the XOR gate, output X=True means trigger a buy order for 1000 shares of XYZ.

If Bob is not concerned with his strategy being transparent, he can set up the gate transaction to evaluate A and B directly within the locking script of the Bitcoin transaction as follows:

<32.08> OP_GREATERTHAN OP_SWAP <5320.01> OP_LESSTHAN OP_NUMEQUAL OP_NOT OP_VERIFY OP_1 metadata1 PubK-Bob OP_2 OP_CHECKMULTSIG Then to unlock this transaction the following script is needed:

Sig-Bob B A <unlocking script>

That is to say, the locking script evaluates whether the threshold values for A and B have been exceeded using script commands inside the locking script.

It will be appreciated that the script analysis presented earlier will be very similar to the case described for Bob. The difference is that instead of comparing for A and B being equal to certain values using the operation OP_EQUAL, the evaluation is whether A and B are greater or less than stored values, using operations OP_GREATERTHAN and OP_LESSTHAN.

Although the example with respect to Bob relates to share prices and market indices, the two values could be any physically measurable parameter and may be a combination of the two examples described above. For example, in a control system for monitoring, say, a refrigeration unit, A may be a temperature and B may be a physical parameter which evaluates to true if a door is open and false if the door is closed. The script may then be unlocked by A exceeding a threshold temperature value and B evaluating to false, i.e. the temperature is above the threshold temperature and the door is closed as this may indicate that something is very wrong in the refrigeration unit, i.e. a leak. This may be evaluated using the OP_GREATERTHAN and the OP_NUMEQUAL commands in the locking script. Alternatively, A and B may be evaluated using computing agents which are established to monitor the respective variables.

Creating a Key Using a Shared Secret

A key may be securely held or recreated. Particularly, in the case of a private key which may be used to derive a public key, the private key may be stored in parts.

The user, i.e. Alice or Bob, may keep one part of their private key, a service provider may keep a second part and a third part may be kept at a remote secure site. The private key may be reconstituted using any two of the three parts, or, more generally, the private key may be reconstituted using any m of n parts.

If the private key can be reconstituted then it can be used to recreate a public key at the point of use and then the private key and the public key can be discarded again after use.

Splitting private keys may be achieved using Shamir's Secret Sharing Scheme. Private key-public key pairs may be deterministically derived from a master key using the following method. This method enables secret values to be shared by participants without ever transmitting them.

The system may generate a public key for a participant using a method of sub-key generation as now described.

Figure 4:
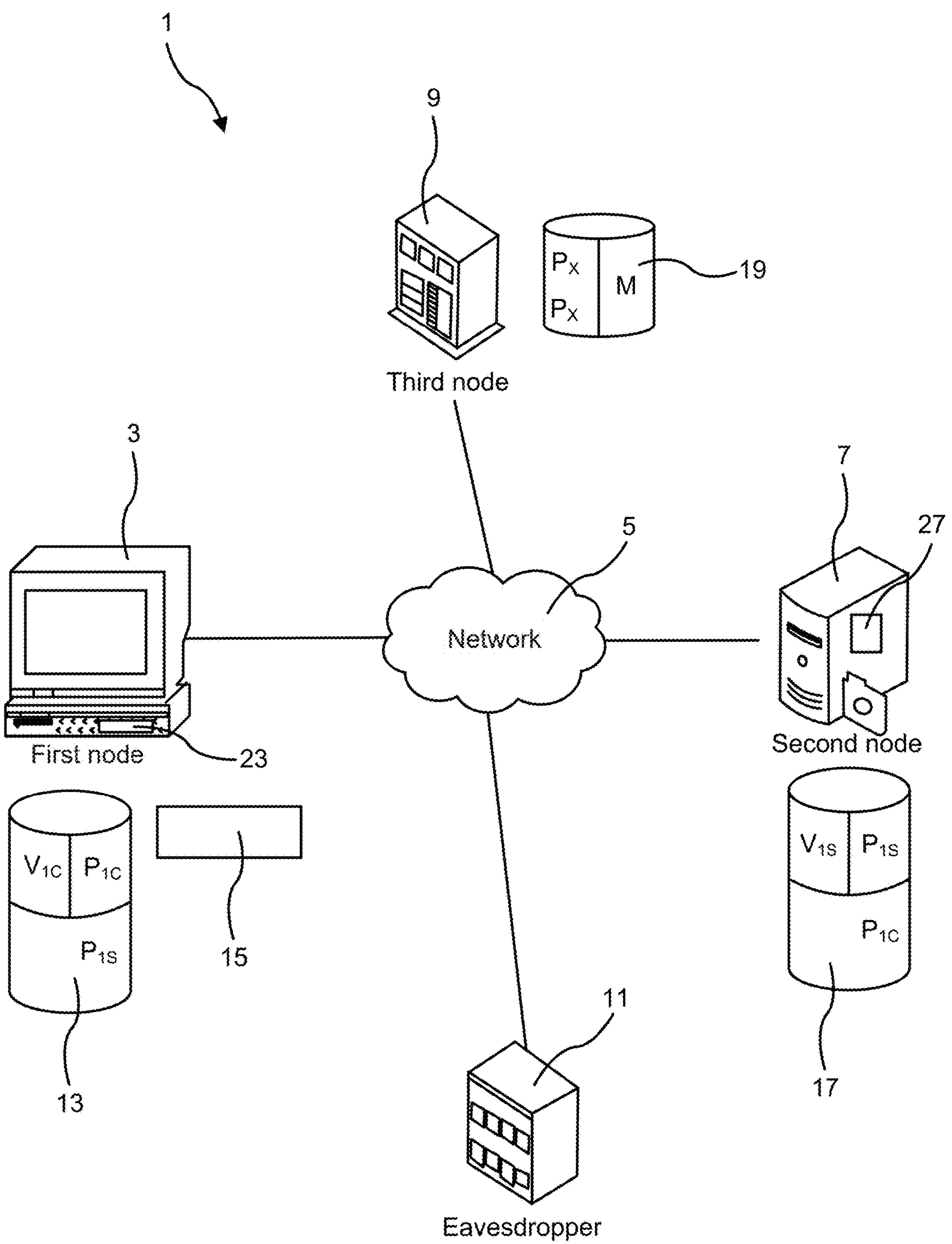
FIGS. 4 to 8 illustrate a technique which can be used to share a secret and generate a public or private key.
Figure 5:
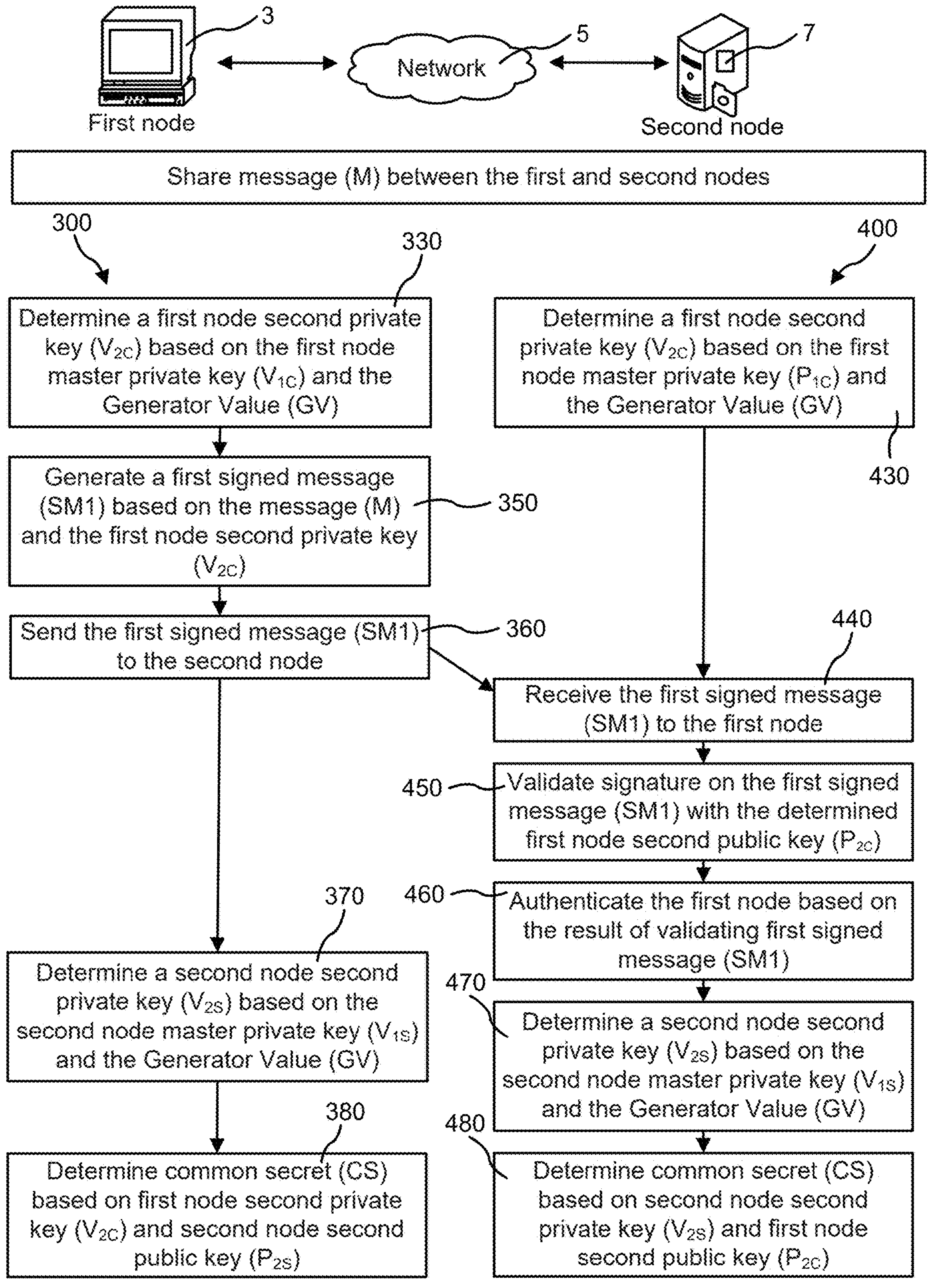

FIG. 4 illustrates a system 1 that includes a first node 3 which is in communication with a second node 7 over a communications network 5. The first node 3 has an associated first processing device 23 and the second node 5 has an associated second processing device 27. The first and second nodes 3, 7 may include an electronic device, such as a computer, phone, tablet computer, mobile communication device, computer server etc. In one example, the first node 3 may be a client (user) device and the second node 7 may be a server. The server may be a digital wallet provider's server.

The first node 3 is associated with a first asymmetric cryptography pair having a first node master private key ($V_{1C}$) and a first node master public key ($P_{1C}$). The second node (7) is associated with a second asymmetric cryptography pair having a second node master private key ($V_{1S}$) and a second node master public key ($P_{1S}$). In other words, the first and second nodes are each in possession of respective public-private key pairs.

The first and second asymmetric cryptography pairs for the respective first and second nodes 3, 7 may be generated during a registration process, such as registration for a wallet.

The public key for each node may be shared publicly, such as over communications network 5.

To determine a common secret (CS) at both the first node 3 and second node 7, the nodes 3, 7 perform steps of respective methods 300, 400 without communicating private keys over the communications network 5.

The method 300 performed by the first node 3 includes determining 330 a first node second private key ($V_{2C}$) based on at least the first node master private key ($V_{1C}$) and a Generator Value (GV). The Generator Value may be based on a message (M) that is a shared between the first and second nodes, which may include sharing the message over the communications network 5 as described in further detail below. The method 300 also includes determining 370 a second node second public key ($P_{2S}$) based on at least the second node master public key ($P_{1S}$) and the Generator Value (GV). The method 300 includes determining 380 the common secret (CS) based on the first node second private key ($V_{2C}$) and the second node second public key ($P_{2S}$).

Importantly, the same common secret (CS) can also be determined at the second node 7 by method 400. The method 400 includes determining 430 a first node second public key ($P_{2C}$) based on the first node master public key ($P_{1C}$) and the Generator Value (GV). The method 400 further include determining 470 a second node second private key ($V_{2S}$) based on the second node master private key ($V_{1S}$) and the Generator Value (GV). The method 400 includes determining 480 the common secret (CS) based on the second node second private key ($V_{2S}$) and the first node second public key ($P_{2C}$).

The communications network 5 may include a local area network, a wide area network, cellular networks, radio communication network, the internet, etc. These networks, where data may be transmitted via communications medium such as electrical wire, fibre optic, or wirelessly may be susceptible to eavesdropping, such as by an eavesdropper 11. The method 300, 400 may allow the first node 3 and second node 7 to both independently determine a common secret without transmitting the common secret over the communications network 5.

Thus one advantage is that the common secret (CS) may be determined securely and independently by each node without having to transmit a private key over a potentially unsecure communications network 5. In turn, the common secret may be used as a secret key (or as the basis of a secret key).

Figure 8:
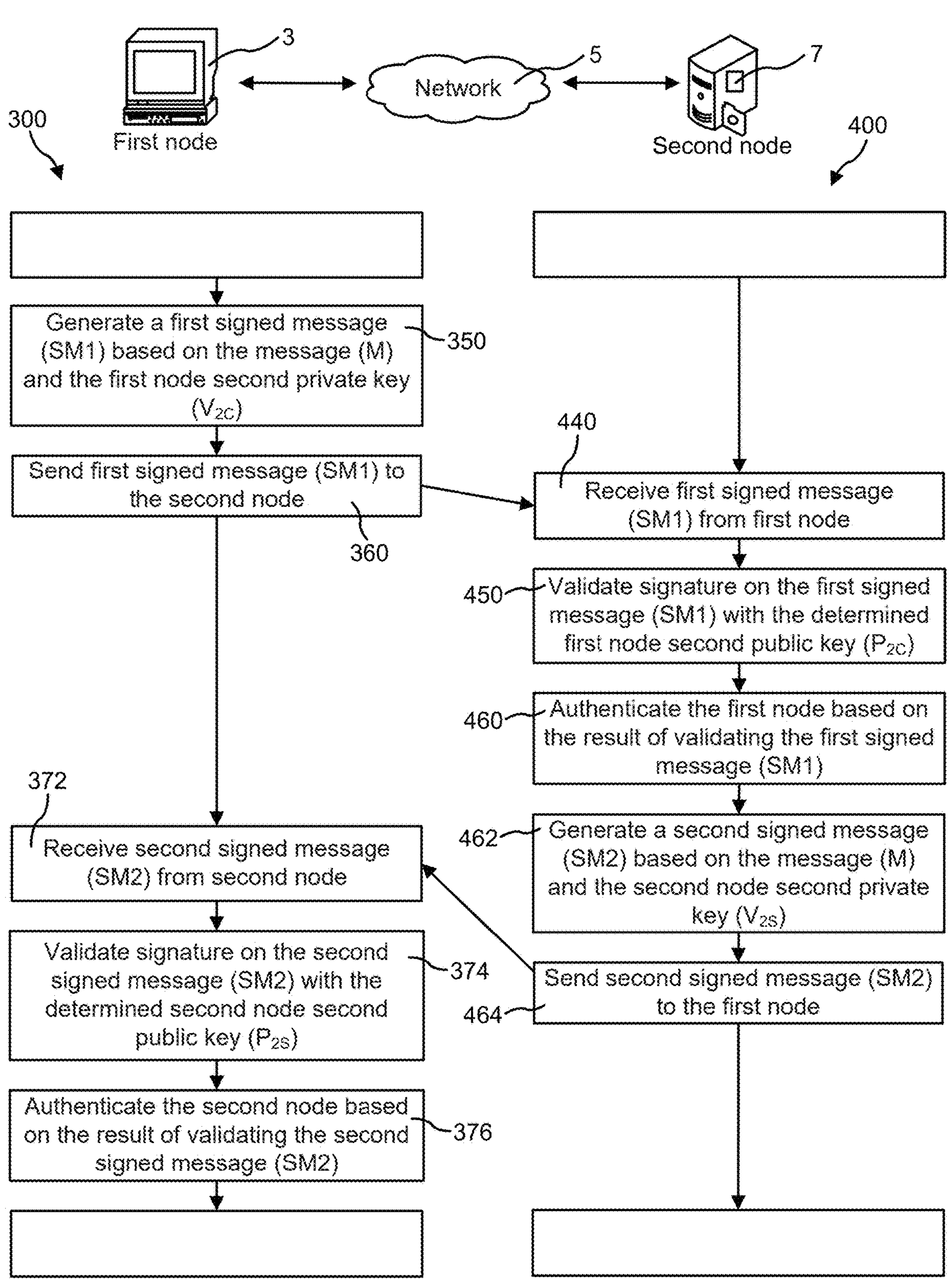

The methods 300, 400 may include additional steps. See FIG. 8. The method 300 may include, at the first node 3, generating a signed message (SM1) based on the message (M) and the first node second private key ($V_{2C}$). The method 300 further includes sending 360 the first signed message (SM1), over the communications network, to the second node 7. In turn, the second node 7 may perform the steps of receiving 440 the first signed message (SM1). The method 400 also includes the step of validating 450 the first signed message (SM2) with the first node second public key ($P_{2C}$) and authenticating 460 the first node 3 based on the result of validating the first signed message (SM1). Advantageously, this allows the second node 7 to authenticate that the purported first node (where the first signed message was generated) is the first node 3. This is based on the assumption that only the first node 3 has access to the first node master private key ($V_{1C}$) and therefore only the first node 3 can determine the first node second private key ($V_{2C}$) for generating the first signed message (SM1). It is to be appreciated that similarly, a second signed message (SM2) can be generated 462 at the second node 7 and sent 464 to the first node 3 such that the first node 3 can receive 372 the second signed message (SM2) from the second node 7, validate 374 the signature on the second signed message (SM2) with the determined second node second public key ($P_{2s}$), and authenticate 376 the second node 7, such as in a peer-to-peer scenario.

Sharing the message (M) between the first and second nodes may be achieved in a variety of ways. In one example, the message may be generated at the first node 3 which is then sent, over the communications network 5, the second node 7. Alternatively, the message may be generated at the second node 7 and then sent, over the communications network 5, to the second node 7. In some examples, the message (M) may be public and therefore may be transmitted over an unsecure network 5. One or more messages (M) may be stored in a data store 13, 17, 19. The skilled person will realise that sharing of the message can be achieved in a variety of ways.

Advantageously, a record to allow recreation of the common secret (CS) may be kept without the record by itself having to be stored privately or transmitted securely.

Method of Registration 100, 200

An example of a method of registration 100, 200 will be described with reference to FIG. 6, where method 100 is performed by the first node 3 and method 200 is performed by the second node 7. This includes establishing the first and second asymmetric cryptography pairs for the respective first and second nodes 3, 7.

The asymmetric cryptography pairs include associated private and public keys, such as those used in public-key encryption. In this example, the asymmetric cryptography pairs are generated using Elliptic Curve Cryptography (ECC) and properties of elliptic curve operations.

In the method 100, 200, this includes the first and second nodes agreeing 110, 210 on a common ECC system and using a base point (G). (Note: the base point could be referred to as a Common Generator, but the term 'base point' is used to avoid confusion with the Generator Value GV). In one example, the common ECC system may be based on secp256K1 which is an ECC system used by Bitcoin. The base point (G) may be selected, randomly generated, or assigned.

Turning now to the first node 3, the method 100 includes settling 110 on the common ECC system and base point (G). This may include receiving the common ECC system and base point from the second node 7, or a third node 9. Alternatively, a user interface 15 may be associated with the first node 3, whereby a user may selectively provide the common ECC system and/or base point (G). In yet another alternative one or both of the common ECC system and/or base point (G) may be randomly selected by the first node 3. The first node 3 may send, over the communications network 5, a notice indicative of using the common ECC system with a base point (G) to the second node 7. In turn, the second node 7 may settle 210 by sending a notice indicative of an acknowledgment to using the common ECC system and base point (G).

The method 100 also includes the first node 3 generating 120 a first asymmetric cryptography pair that includes the first node master private key ($V_{1C}$) and the first node master public key ($P_{1C}$). This includes generating the first master private key ($V_{1C}$) based, at least in part, on a random integer in an allowable range specified in the common ECC system. This also includes determining the first node master public key ($P_{1C}$) based on elliptic curve point multiplication of the first node master private key ($P_{1C}$) and the base point (G) according to the formula:

$$P_{1C} = V_{1C} \times G \qquad \text{(Equation 1)}$$

Thus the first asymmetric cryptography pair includes:

$V_{1C}$: The first node master private key that is kept secret by the first node.

$P_{1C}$: The first node master public key that is made publicly known.

The first node 3 may store the first node master private key ($V_{1C}$) and the first node master public key ($P_{1C}$) in a first data store 13 associated with the first node 3. For security, the first node master private key ($V_{1C}$) may be stored in a secure portion of the first data store 13 to ensure the key remains private.

Figure 6:
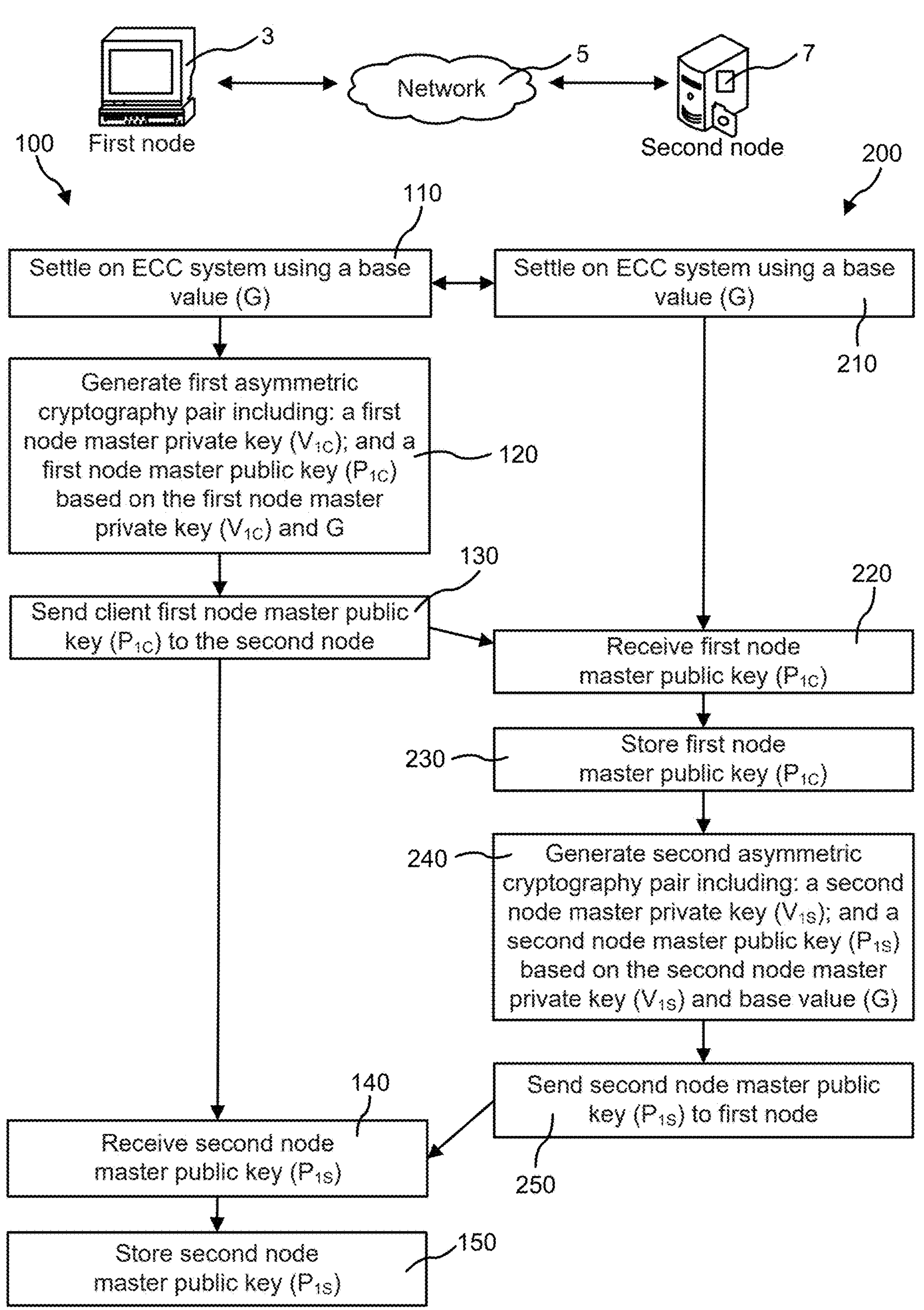

The method 100 further includes sending 130 the first node master public key ($P_{1C}$), over the communications network 5, to the second node 7, as shown in FIG. 6. The second node 7 may, on receiving 220 the first node master public key ($P_{1C}$), store 230 the first node master public key ($P_{1C}$) in a second data store 17 associated with the second node 7.

Similar to the first node 3, the method 200 of the second 7 includes generating 240 a second asymmetric cryptography pair that includes the second node master private key ($V_{1S}$) and the second node master public key ($P_{1S}$). The second node master private key ($V_{1S}$) is also a random integer within the allowable range. In turn, the second node master public key ($P_{1S}$) is determined by the following formula:

$$P_{1S} = V_{1S} \times G \qquad \text{(Equation 2)}$$

Thus the second asymmetric cryptography pair includes:

$V_{1S}$: The second node master private key that is kept secret by the second node.

$P_{1S}$: The second node master public key that is made publicly known.

The second node 7 may store the second asymmetric cryptography pair in the second data store 17. The method 200 further includes sending 250 the second node master public key ($P_{1S}$) to the first node 3. In turn, the first node 3 may receive 140 and stores 150 the second node master public key ($P_{1S}$).

It is to be appreciated that in some alternatives, the respective public master keys may be received and stored at a third data store 19 associated with the third node 9 (such as a trusted third party). This may include a third party that acts as a public directory, such as a certification authority. Thus in some examples, the first node master public key ($P_{1C}$) may requested and received by the second node 7 only when determining the common secret (CS) is required (and vice versa).

The registration steps may only need to occur once as an initial setup.

Session Initiation and Determining the Common Secret by the First Node 3

Figure 7:
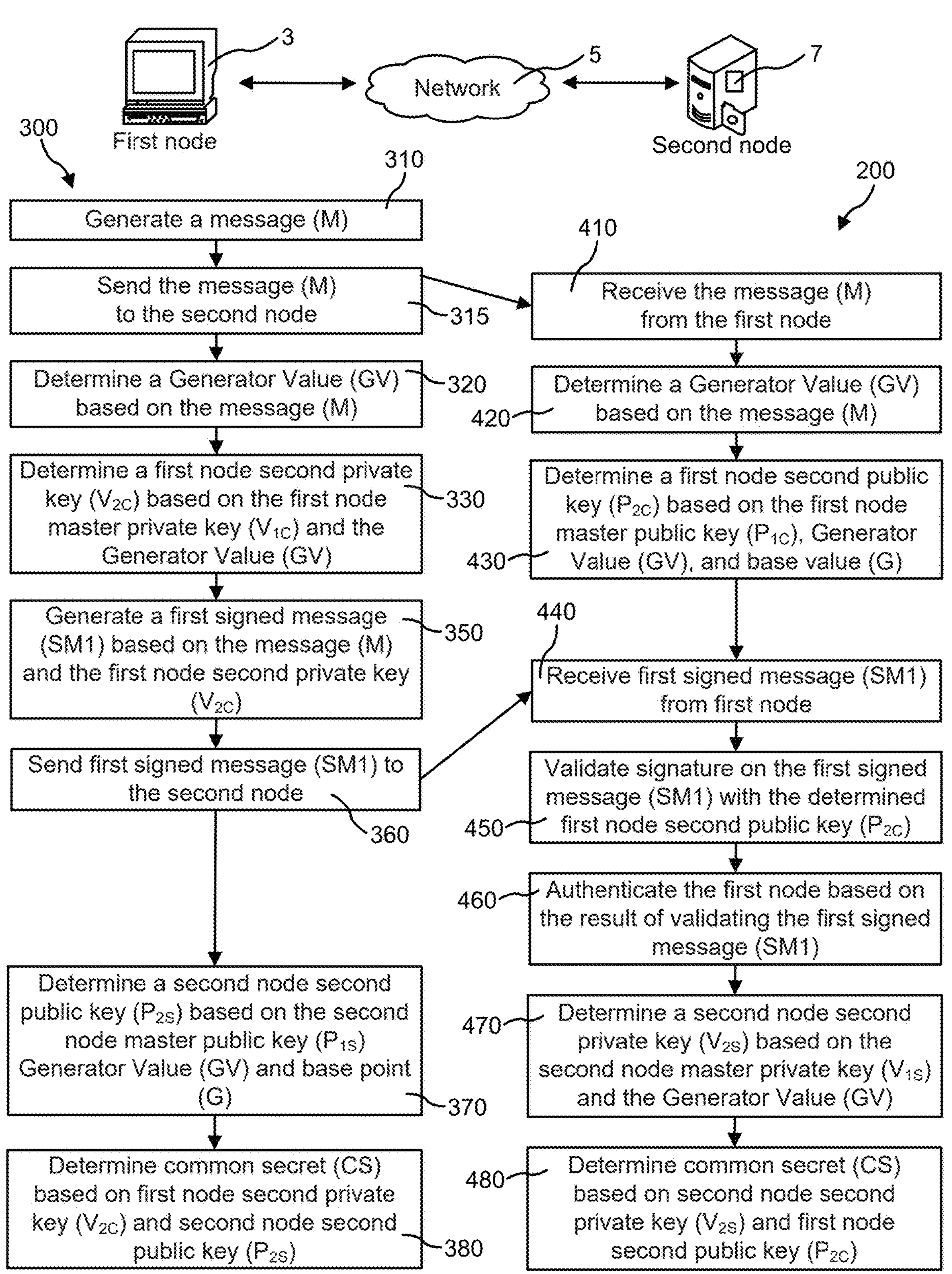

An example of determining a common secret (CS) will now be described with reference to FIG. 7. The common secret (CS) may be used for a particular session, time, transaction, or other purpose between the first node 3 and the second node 7 and it may not be desirable, or secure, to use the same common secret (CS). Thus the common secret (CS) may be changed between different sessions, time, transactions, etc.

The following is provided for illustration of the secure transmission technique which has been described above.

Generating a Message (M) 310

In this example, the method 300 performed by the first node 3 includes generating 310 a message (M). The message (M) may be random, pseudo random, or user defined. In one example, the message (M) is based on Unix time and a nonce (and arbitrary value). For example, the message (M) may be provided as:

$$\text{Message } (M) = UnixTime + nonce \qquad \text{(Equation 3)}$$

In some examples, the message (M) is arbitrary. However it is to be appreciated that the message (M) may have selective values (such as Unix Time, etc) that may be useful in some applications.

The method 300 includes sending 315 the message (M), over the communications network 3, to the second node 7. The message (M) may be sent over an unsecure network as the message (M) does not include information on the private keys.

Determining a Generator Value (GV) 320

The method 300 further includes the step of determining 320 a Generator Value (GV) based on the message (M). In this example, this includes determining a cryptographic hash of the message. An example of a cryptographic hash algorithm includes SHA-256 to create a 256-bit Generator Value (GV). That is:

$$GV = SHA-256(M) \quad \text{(Equation 4)}$$

It is to be appreciated that other hash algorithms may be used. This may include other has algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

Determining a First Node Second Private Key 330

The method 300 then includes the step 330 of determining 330 the first node second private key ($V_{2C}$) based on the second node master private key ($V_{1C}$) and the Generator Value (GV). This can be based on a scalar addition of the first node master private key ($V_{1C}$) and the Generator Value (GV) according to the following formula:

$$V_{2C} = V_{1C} + GV \quad \text{(Equation 5)}$$

Thus the first node second private key ($V_{2C}$) is not a random value but is instead deterministically derived from the first node master private key. The corresponding public key in the cryptographic pair, namely the first node second public key ($P_{2C}$), has the following relationship:

$$P_{2C} = V_{2C} \times G \quad \text{(Equation 6)}$$

Substitution of $V_{2C}$ from Equation 5 into Equation 6 provides:

$$P_{2C} = (V_{1C} + GV) \times G \quad \text{(Equation 7)}$$

where the '+' operator refers to elliptic curve point addition. Noting that elliptic curve cryptography algebra is distributive, Equation 7 may be expressed as:

$$P_{2C} = V_{1C} \times G + GV \times G \quad \text{(Equation 8)}$$

Finally, Equation 1 may be substituted into Equation 7 to provide:

$$P_{2C} = P_{1C} + GV \times G \quad \text{(Equation 9.1)}$$

$$P_{2C} = P_{1C} + SHA-256(M) \times G \quad \text{(Equation 9.2)}$$

Thus the corresponding first node second public key ($P_{2C}$) can be derivable given knowledge of the first node master public key ($P_{1C}$) and the message (M). The second node 7 may have such knowledge to independently determine the first node second public key ($P_{2C}$) as will be discussed in further detail below with respect to the method 400.

Generate a First Signed Message (SM1) Based on the Message and the First Node Second Private Key 350

The method 300 further includes generating 350 a first signed message (SM1) based on the message (M) and the determined first node second private key ($V_{2C}$). Generating a signed message includes applying a digital signature algorithm to digitally sign the message (M). In one example, this includes applying the first node second private key ($V_{2C}$) to the message in an Elliptic Curve Digital Signature Algorithm (ECDSA) to obtain the first signed message (SM1). Examples of ECDSA include those based on ECC systems with secp256k1, secp256r1, secp384r1, se3cp521r1.

The first signed message (SM1) can be verified with the corresponding first node second public key ($P_{2C}$) at the second node 7. This verification of the first signed message (SM1) may be used by the second node 7 to authenticate the first node 3, which will be discussed in the method 400 below.

Determine a Second Node Second Public Key 370'

The first node 3 may then determine 370 a second node second public key ($P_{2S}$). As discussed above, the second node second public key ($P_{2S}$) may be based at least on the second node master public key ($P_{1S}$) and the Generator Value (GV). In this example, since the public key is determined 370' as the private key with elliptic curve point multiplication with the base point (G), the second node second public key ($P_{2S}$) can be expressed, in a fashion similar to Equation 6, as:

$$P_{2S} = V_{2S} \times G \quad \text{(Equation 10.1)}$$

$$P_{2S} = P_{1S} + GV \times G \quad \text{(Equation 10.2)}$$

The mathematical proof for Equation 10.2 is the same as described above for deriving Equation 9.1 for the first node second public key ($P_{2C}$). It is to be appreciated that the first node 3 can determine 370 the second node second public key independently of the second node 7.

Determine the Common Secret 380 at the First Node 3

The first node 3 may then determine 380 the common secret (CS) based on the determined first node second private key ($V_{2C}$) and the determined second node second public key ($P_{2S}$). The common secret (CS) may be determined by the first node 3 by the following formula:

$$S = V_{2C} \times P_{2S} \quad \text{(Equation 11)}$$

Method 400 Performed at the Second Node 7

The corresponding method 400 performed at the second node 7 will now be described. It is to be appreciated that some of these steps are similar to those discussed above that were performed by the first node 3.

The method 400 includes receiving 410 the message (M), over the communications network 5, from the first node 3. This may include the message (M) sent by the first node 3 at step 315. The second node 7 then determines 420 a Generator Value (GV) based on the message (M). The step of determining 420 the Generator Value (GV) by the second node 7 is similar to the step 320 performed by the first node described above. In this example, the second node 7 performs this determining step 420 independent of the first node 3.

The next step includes determining 430 a first node second public key ($P_{2C}$) based on the first node master public key ($P_{1C}$) and the Generator Value (GV). In this example, since the public key is determined 430' as the private key with elliptic curve point multiplication with the base point (G), the first node second public key ($P_{2C}$) can be expressed, in a fashion similar to Equation 9, as:

$$P_{2C} = V_{2C} \times G \quad \text{(Equation 12.1)}$$

$$P_{2C} = P_{1C} + GV \times G \quad \text{(Equation 12.2)}$$

The mathematical proof for Equations 12.1 and 12.2 is the same as those discussed above for Equations 10.1 and 10.2.

The Second Node 7 Authenticating the First Node 3

The method 400 may include steps performed by the second node 7 to authenticate that the alleged first node 3, is the first node 3. As discussed previously, this includes receiving 440 the first signed message (SM1) from the first node 3. The second node 7 may then validate 450 the signature on the first signed message (SM1) with the first node second public key ($P_{2C}$) that was determined at step 430.

Verifying the digital signature may be done in accordance with an Elliptic Curve Digital Signature Algorithm (ECDSA) as discussed above. Importantly, the first signed message (SM1) that was signed with the first node second private key ($V_{2C}$) should only be correctly verified with the corresponding first node second public key ($P_{2C}$), since $V_{2C}$ and $P_{2C}$ form a cryptographic pair. Since these keys are deterministic on the first node master private key ($V_{1C}$) and the first node master public key ($P_{1C}$) that were generated at registration of the first node 3, verifying first signed message (SM1) can be used as a basis of authenticating that an alleged first node sending the first signed message (SM1) is the same first node 3 during registration. Thus the second node 7 may further perform the step of authenticating (460) the first node 3 based on the result of validating (450) the first signed message.

The Second Node 7 Determining the Common Secret

The method 400 may further include the second node 7 determining 470 a second node second private key ($V_{2S}$) based on the second node master private key ($V_{1S}$) and the Generator Value (GV). Similar to step 330 performed by the first node 3, the second node second private key ($V_{2S}$) can be based on a scalar addition of the second node master private key ($V_{1S}$) and the Generator Value (GV) according to the following formulas:

$$V_{2S} = V_{1S} + GV \quad \text{(Equation 13.1)}$$

$$V_{2S} = V_{1S} + SHA-256(M) \quad \text{(Equation 13.2)}$$

The second node 7 may then, independent of the first node 3, determine 480 the common secret (CS) based on the second node second private key ($V_{2S}$) and the first node second public key ($P_{2C}$) based on the following formula:

$$S = V_{2S} \times P_{2C} \quad \text{(Equation 14)}$$

Proof of the Common Secret (CS) Determined by the First Node 3 and Second Node 7

The common secret (CS) determined by the first node 3 is the same as the common secret (CS) determined at the second node 7. Mathematical proof that Equation 11 and Equation 14 provide the same common secret (CS) will now be described.

Turning to the common secret (CS) determined by the first node 3, Equation 10.1 can be substituted into Equation 11 as follows:

$$S = V_{2C} \times P_{2S} \quad \text{(Equation 11)}$$

$$S = V_{2C} \times (V_{2S} \times G)$$

$$S = (V_{2C} \times V_{2S}) \times G \quad \text{(Equation 15)}$$

Turning to the common secret (CS) determined by the second node 7, Equation 12.1 can be substituted into Equation 14 as follows:

$$S = V_{2S} \times P_{2C} \quad \text{(Equation 14)}$$

$$S = V_{2S} \times (V_{2C} \times G)$$

$$S = (V_{2S} \times V_{2C}) \times G \quad \text{(Equation 16)}$$

Since ECC algebra is commutative, Equation 15 and Equation 16 are equivalent, since:

$$S = (V_{2C} \times V_{2S}) \times G = (V_{2S} \times V_{2C}) \times G \quad \text{(Equation 17)}$$

The Common Secret (CS) and Secret Key

The common secret (CS) may now be used as a secret key, or as the basis of a secret key in a symmetric-key algorithm for secure communication between the first node 3 and second node 7.

The common secret (CS) may be in the form of an elliptic curve point (xs, ys). This may be converted into a standard key format using standard publicly known operations agreed by the nodes 3, 7. For example, the xs value may be a 256-bit integer that could be used as a key for $AES_{256}$ encryption. It could also be converted into a 160-bit integer using RIPEMD160 for any applications requiring this length key.

The common secret (CS) may be determined as required. Importantly, the first node 3 does not need to store the common secret (CS) as this can be re-determined based on the message (M). In some examples, the message(s) (M) used may be stored in data store 13, 17, 19 (or other data store) without the same level of security as required for the master private keys. In some examples, the message (M) may be publicly available. However depending on some application, the common secret (CS) could be stored in the first data store (X) associated with the first node provided the common secret (CS) is kept as secure as the first node master private key ($V_{1C}$).

Advantageously, this technique can be used to determine multiple common secrets that may correspond to multiple secure secret keys based on a single master key cryptography pair.

Hierarchy of Generator Values (Keys)

For example, a series of successive Generator Values (GVs) may be determined, where each successive GV may be determined based on the preceding Generator Value (GV). For example, instead of repeating steps 310 to 370 and 410 to 470 to generate successive single-purpose keys, by prior agreement between the nodes, the previously used Generator Value (GV) can be rehashed repeatedly by both parties to establish a hierarchy of Generator Values. In effect, the Generator Value, based on the hash of a message (M), can be a next generation message (M') for the next generation of Generator Value (GV'). Doing this allows successive generations of shared secrets to be calculated without the need for further protocol-establishment transmissions, in particular transmission of multiple messages for each generation of common secrets. The next generation common secret (CS') can be computed as follows.

Firstly, both the first node 3 and the second node 7 independently determine the next generation of the Generator Value (GV'). This is similar to steps 320 and 420 but adapted with the following formulas:

$$M' = SHA-256(M) \quad \text{(Equation 18)}$$

$$GV' = SHA-256(M') \quad \text{(Equation 19.1)}$$

$$GV' = SHA-256(SHA-256(M)) \quad \text{(Equation 19.2)}$$

The first node 3 may then determine the next generation of the second node second public key ($P_{2S}$') and the first node second private key ($V_{2C}$') similar to steps 370 and 330 described above, but adapted with the following formulas:

$$P_{2S}' = P_{1S} + GV' \times G \quad \text{(Equation 20.1)}$$

$$V_{2C}' = V_{1C} + GV' \quad \text{(Equation 20.2)}$$

The second node 7 may then determine the next generation of the first node second public key ($P_{2C}$') and the second node second private key ($V_{2S}$') similar to steps 430 and 470 described above, but adapted with the following formulas:

$$P_{2C}' = P_{1C} + GV' \times G \quad \text{(Equation 21.1)}$$

$$V_{2S}' = V_{1S} + GV' \quad \text{(Equation 21.2)}$$

The first node 3 and the second node 7 may then each determine the next generation common secret (CS'). In particular, the first node 3 determines the next generation common secret (CS') with the formula:

$$CS' = V_{2C}' \times P_{2S}' \quad \text{(Equation 22)}$$

The second node 7 determines the next generation common secret (CS') with the formula:

$$CS' = V_{2S}' \times P_{2C}' \quad \text{(Equation 23)}$$

Further generations (CS'', CS''', etc.) can be calculated in the same way to create a chain hierarchy. This technique requires that both the first node 3 and the second node 7 keep track of the original Message (M) or the originally calculated Generator Value (GV), and to which node it relates. As this is publicly known information there are no security issues regarding the retention of this information. Accordingly, this information might be kept on 'hash tables' (linking hash values to public keys) and distributed freely across the network 5 (for example using Torrent). Furthermore, if any individual common secret (CS) in the hierarchy is ever compromised, this does not affect the security of any other common secrets in the hierarchy provided the private keys Vic, Vis remain secure.

Tree Structure of Keys

As well as a chain (linear) hierarchy as described above, a hierarchy in the form of a tree structure can be created. With a tree structure, a variety of keys for different purposes such as authentication keys, encryption keys, signing keys, payment keys, etc. may be determined whereby these keys are all linked to a single securely maintained master key. This is best illustrated in FIG. 12 that shows a tree structure 901 with a variety of different keys. Each of these can be used to create a shared secret with another party. Tree branching can be accomplished in several ways, three of which are described below.

(i) Master Key Spawning

In the chain hierarchy, each new 'link' (Public/Private key pair) is created by adding a multiply rehashed Message to the original master key. For example, (showing only the private key of the first node 3 for clarity):

$$V_{2C} = V_{1C} + SHA-256(M) \quad \text{(Equation 24)}$$

$$V_{2C}' = V_{1C} + SHA-256(SHA-256(M)) \quad \text{(Equation 25)}$$

$$V_{2C}'' = V_{1C} + SHA-256(SHA-256(SHA-256(M))) \quad \text{(Equation 26)}$$

and so on.

To create a branch, any key can be used as a sub-master key. For example $V_{2C}$' can be used as a sub-master key ($V_{3C}$) by adding the hash to it as is done for the regular master key:

$$V_{3C} = V_{2C}' + SHA-256(M) \quad \text{(Equation 27)}$$

The sub-master key ($V_{3C}$) may itself have a next generation key ($V_{3C}$'), for example:

$$V_{3C}' = V_{2C}' + SHA-256(SHA-256(M)) \quad \text{(Equation 28)}$$

This provides a tree structure 903 using the master key spawning method as shown in FIG. 13.

(ii) Logical Association

In this method all the nodes in the tree (public/private key pairs) are generated as a chain (or in any other way) and the logical relationships between the nodes in the tree is maintained by a table in which each node in the tree is simply associated with its parent node in the tree using a pointer. Thus the pointer may be used to determine the relevant public/private key pairs for determining the common secret key (CS) for the session.

(iii) Message Multiplicity

New private/public key pairs can be generated by introducing a new message at any point in the chain or tree. The message itself may be arbitrary or may carry some meaning or function (e.g. it might be related to a 'real' bank account number, etc). It may be desirable that such new messages for forming the new private/public key pairs are securely retained.

Codification Scheme

The metadata of the transaction may be used to access instructions stored in an off-block document. This document might be referred to as a 'contract'. The metadata which is used to reference the contract can be formatted in a variety of ways. However, a suitable codification scheme is described here.

A contract is transferable if the rights it defines are conferred upon the holder or owner of the contract. An example of a non-transferable contract is one in which the participants are named—that is, where the rights are conferred upon a specific named entity rather than the holder of the contract. Only transferable contracts are discussed in this codification scheme.

A token represents a specific contract that details or defines rights conferred by a contract. In accordance with the present invention, the token is a representation of the contract in the form of a bitcoin transaction.

This codification method uses metadata comprising three parameters or data items. This data may be indicative of:

i) an amount of shares available under the contract (this may be referred to herein as 'NumShares');
ii) a quantity of transfer units to be transferred from a sender to at least one recipient (this may be referred to herein as 'ShareVal'); and
iii) a factor for calculating a value for the quantity of transfer units (this may be referred to herein as a 'pegging rate').

An advantage of this codification scheme is that it can be used to encapsulate or represent contracts as tokens on a blockchain using only the three parameters described above. In effect, the contract can be specified using a minimum of these three data items. As this codification scheme can be used for any type of transferable contract, common algorithms can be devised and applied. Further detail of these metadata items is provided as follows.

A divisible token is one in which the value on a transaction output may be subdivided into smaller amounts allocated across multiple tokens (i.e. allocated across multiple transactions). The archetype is tokenised fiat currency. Divisible contracts are defined as those that specify a non-zero PeggingRate. For divisible contracts the tokenised value transferred in the transaction output is tied to the underlying bitcoin (BTC) value via the PeggingRate. That is, the contract specifies the holder's rights in terms of a pegging-rate. For non-divisible tokens there is no PeggingRate and the contract specifies the holder's rights in terms of a fixed value (e.g. like a bearer bond: 'this contract is redeemable for exactly $1000' or a voucher 'this contract is redeemable for one haircut'). For non-divisible contracts the underlying transaction BTC value is irrelevant to the contract value.

The phrase "Underlying BTC value" refers to the bitcoin amount (BTC) attached to the transaction output. In the Bitcoin protocol every transaction output must have non-zero BTC amount to be considered valid. In fact, the BTC amount must be greater than a set minimum (known as 'dust') which, at the time of writing, is currently set to 546 satoshis. 1 bitcoin is defined as being equal to 100 million satoshis. As the bitcoin transactions are here used only as a means of facilitating an exchange of ownership, the actual underlying BTC amount is arbitrary: the true value lies in the contract specification. In theory every token could be carried by dust.

In accordance with the present codification scheme, specifically for divisible tokens, the underlying BTC value does have a meaning: it bears a relationship to the contract value via a PeggingRate. The PeggingRate is itself arbitrary and is chosen so as to keep the underlying BTC amount small. The reason for using a PeggingRate rather than simply underlying every token transaction with dust is because the protocol of the present invention facilitates divisibility: when a token is split into several transaction outputs of smaller amounts it is not necessary to adjust the original contract. Rather, the contract value of each subdivided token is simply calculated based on the PeggingRate and the subdivided amount of underlying BTC value.

A limited token is one in which a total issuance value is fixed (or 'limited') by a fixed non-zero number of shares as defined by a quantity called NumShares. Therefore, no further shares may be issued under a limited contract. For example a contract for part ownership of a race horse is limited to 100% of the race horse (e.g. 100 shares at 1% each or 10 shares at 10% each, etc.). An unlimited contract implies that the issuer is able to underwrite further issuances of shares, for example by adding the required amount of fiat currency into their Reserve Account. NumShares must be explicitly stated on all contracts. Limited contracts must have NumShares >0; unlimited contracts are denoted by setting Num Shares=0.

The archetypical example is a currency reserve (analogous to a gold reserve) such that the total value held in the reserve bank account matches the total value in promissory notes in existence (i.e. unredeemed tokens). This concept extends beyond currency reserves to include stock inventory. For example, an issuer of licensed printed t-shirt tokens may start with an inventory of 10,000 T-shirts in stock and may issue a divisible token to represent those 10,000 t-shirts (where, say, each share=1 t-shirt). The original token could be subdivided and each subdivided token would be redeemable for a number of t-shirts according to the transaction output's underlying BTC value as defined by the PeggingRate. If demand increases, however, the issuer may decide to issue further shares (i.e. increase the number of shares in circulation by (say) another 10,000). In such cases it is incumbent on the issuer to deposit a further 10,000 t-shirts into his reserve account (i.e. stock warehouse) in order to underwrite the further issuance. Thus, the total number of t-shirts in stock (where stock acts as 'reserve account') at any one time=the total number of unredeemed shares.

PeggingRates only apply to divisible contracts, wherein the value of a share (represented by a quantity called ShareVal) is pegged to the underlying BTC amount. For example, the contract might specify that the issuer promises to redeem the token at a rate of $10,000 for every underlying 1 BTC. That would mean (for example) that a transaction with a tokenised underlying output value of 15,400 satoshis would be redeemable for $1.54. A value of 0 for the PeggingRate indicates that the contract is non-divisible (i.e. can only be transferred whole, like a bearer bond). When the PeggingRate is set to 0 (meaning non-divisible token) the underlying BTC value is not relevant to the contract value and can be set at any amount. Normally in this case it is desirable to keep the underlying BTC amount as small as possible (i.e. set to dust) to minimise operating costs.

NumShares is the total (fixed) number of shares available under the (Limited) contract. For limited contracts NumShares must be a whole number greater than zero. For unlimited contracts NumShares is not fixed as more shares can be issued at any time (provided they are underwritten), which is denoted by setting the value to 0.

A share is defined as the unit of transfer and the ShareVal is the value of that unit. For example, for fiat currency, the unit of transfer may be set to 1 cent. Or, for example, it may be set to 50 cents, in which case transfers may only be executed in 'lots' of 50 cents. ShareVal may also be expressed as a percentage: for example if a breeder wants to sell a racehorse in 10 equal shares then the ShareVal=10%. ShareVal must be >0 and must be defined on the contract.

TotalIssuance represents the total value of shares issued. This value only relates to limited contracts as for unlimited contracts the issuance is not fixed and more shares may be issued. If the shares are expressed as a percentage then the TotalIssuance=100% by definition.

For limited contracts NumShares, ShareVal, and TotalIssuance are related in the following way:

NumShares×ShareVal=TotalIssuance.

A value of 0 for TotalIssuance implies it is an unlimited contract. An example of an unlimited contract is fiat currency (so TotalIssuance is set to 0); examples of limited contracts are: (i) limited edition commemorative coins (1000 minted, where 1 share=1 coin): TotalIssuance=1000×1=1000 coins; and (ii) seats at a ticketed venue, where TotalIssuance=total number of seats available.

The circulation is defined as the total value of unspent tokens (i.e. as determined by transactions in UTXO—unspent transaction output). The full set of all unspent transactions is kept in a list available to all bitcoin nodes. For example, if an issuer initially issues $10,000 as fiat currency type tokens and over time $5500 worth of tokens are redeemed, then the circulation=$4500 (being the value of unredeemed tokens). This value should reconcile to the balance in the associated reserve account.

An Illustrative Example of a Computing Resource ('Agent') Suitable for Use with Embodiments of the Invention The present invention can utilise a suitably arranged computing resource (herein "agent") to perform automated aspects of a desired process. An example of a suitable and preferable agent is provided below, although other implementations may be used.

The agent may operate in conjunction with the blockchain, using it as the non-erasable tape in the implementation of a Turing machine. This agent runs in parallel with the blockchain network, overseeing and handling the execution of a (looping) process. The looping process is designed to perform a given task such as, for example, the automation of a process or control of a device or system. This parallel resource monitors the state of the blockchain and can cause transactions to be written to the blockchain. In one sense, it utilises the Blockchain as a non-erasable tape of the Turing Machine, with the following definitions and features:

1. the Blockchain acts as the tape of the Turing Machine. Each transaction in the Blockchain represents a cell on the tape. This cell can contain symbols from a finite alphabet.
2. The tape head can read information from the blocks that have already been written onto the Blockchain.
3. The tape head can write new blocks, containing many transactions, to the end of the Blockchain. However, they cannot write onto blocks that already exist. As such, the Blockchain tape is non-erasable.
4. Metadata for each transaction can be stored as part of a multi-signature pay-to-script-hash (P2SH) transaction.

An important function of the agent is to act as an automated entity that monitors the current state of the Blockchain. It can also receive a signal or input from any off-block source. Depending on the Blockchain state and/or a received input, the agent may perform certain actions. The agent decides which action(s) are to be performed. These may or may not involve actions in the 'real world' (i.e. off block) and/or actions on the Blockchain (such as creating and broadcasting new transactions). The action that the agent takes may be triggered by the Blockchain state. The agent may also decide on the next set of transactions to be broadcast to the Bitcoin network, and subsequently written to the Blockchain.

The agent's action(s) run in parallel and simultaneously to the Blockchain (eg Bitcoin) network. In a sense, this extends the function of blockchain (eg Bitcoin) script. This continuous monitoring implements the 'loop' control-flow constructs making the combined agent and Blockchain system Turing Complete.

The Turing Machine includes two stacks:

Data stack: This is represented by the Blockchain as described above.

Control stack: This is represented by the agent function. This stores information relating to the repeat control-flow function.

The separation of the control stack from the data stack provides the advantage of preventing infinite loops from occurring within the Bitcoin core, mitigating denial-of-service attacks.

The agent manages and runs subroutines that are able to loop via any type of loop construct (e.g. FOR-NEXT; REPEAT UNTIL; etc). An illustrative embodiment described herein includes a process using one example of the 'repeat' construct. The user may specify the index (i) and the limit (J). These represent the current iteration number (typically counted starting from 0) and the total number of iterations of the repeat loop respectively.

For each iteration:

1. The Index increments by 1. For the exit condition, the iterations will stop when the index reaches the limit
2. A code block containing an "if condition then action" (ICTA) statement is executed; the action may be any action on or off the blockchain;
3. A cryptographic hash of this subroutine is computed. This can be stored in the Blockchain as part of a transaction. Since the hash is unique to each code, it will enable verification of which code has been used The body of the loop includes a code block. Each code block contains a "If condition then action" (ICTA) statement. This monitors the current state of the Blockchain for transactions matching the:

Start or triggering condition (e.g when a particular date is reached).

Repeat condition (i.e. a metadata or hash associated with the previous iteration).

Stop condition (i.e. last iteration of the loop).

The ICTA statement enables the agent to decide on the next transaction to make, based on the current state of the blockchain. Making the next transaction involves broadcasting the transaction onto the Bitcoin network, and writing the new transaction onto the Blockchain. This acts as a record that this iteration has been executed. Once the transaction has been written onto the Blockchain, the Manager will subsequently find that the previous iteration has been executed and written onto the Blockchain, and will execute the next iteration. The latter continues until the repeat loop exits when the index (i) reaches the limit (J) specified in the code block.

Each transaction is saved in the blockchain in a way that can be reused. In a Bitcoin implementation, each signature in a transaction is appended with a SIGHASH flag. This flag can take on different values, each indicating whether other parts of the transaction can be amended without involvement of the owner of this signature. A reusable transaction has the SIGHASH flag 'SigHash_AnyoneCanPay' in one of the transaction inputs. This permits anyone to contribute to the inputs of the transaction. This parameter enables the agent's ICTA function to be executed and repeated multiple times and with different inputs. Use of the function can be restricted to authorised parties—for example, via copyright of the reusable transaction.

The 'If condition' section of the ICTA code block can monitor any type of condition. This is similar to other programming languages (e.g. C, C++, Java) and not limited to information stored on the Blockchain. For example, it could monitor the date and time (i.e. when a certain date and time are reached) or monitor the weather (i.e. when the temperature is below 10° C. and it is raining), monitor the conditions of a contract or a trust (i.e. when company A buys company B).

The 'Then action' section of the ICTA code block can execute a number of actions. The invention is not limited with regard to the number or type of actions that can be taken. The action is not limited to a transaction on the Blockchain, although a transaction containing metadata related to the action may be written on the Blockchain.

The metadata can be of any form. However, in one embodiment, the metadata may store a hyperlink to a file containing more data or instructions relating to the action. The metadata may store both a hyperlink to a hash table containing more data or instructions relating to the action along with a hash of the action that acts as the loop-up key for the hash table.

The agent's control stack can be implemented in a number of ways that are specific to the needs of each user. For example, the repeat loop of the control stack can be based on any Turing Complete language. One possible choice of language is the Forth style stack-based language. An advantage of using this language is that it keeps the control stack consistent in programming style with the Bitcoin scripts which are already known and in wide usage.

Using the Bitcoin Script's Alternate Stack as a Data Storage Space

The Bitcoin script contains commands, also called op codes, which enable users to move data onto an alternative stack, known as the 'alt stack'.

The op codes are:

OP_TOALTSTACK—which moves data from the top of the main stack onto the top of the alt stack.

OP_FROMALTSTACK—which moves data from the top of the alt stack to the top of the main stack.

This enables data from intermediate steps of calculations to be stored in the alt stack, similar to the 'memory' function which allows data to be stored on the calculator. In one embodiment, the alt stack is used for configuring bitcoin scripts to solve small computation tasks and returning the results in the computation.

Using a Code Register to Manage the Agent

The agent also manages a registry of all the codes that it owns and runs. This registry is structured like a lookup table or dictionary that maps a specific key to a specific value. The key and value pair is represented by the hash of the code block ($H_1$) and the IPv6 address of where the code is stored respectively. To retrieve the code block using the key $H_1$, the lookup table is used to retrieve the associated value (this is the location where the code is stored) and retrieves the source code accordingly. The implementation of the code registry can vary.

Transaction Metadata of the Agent's Code, and Re-Spawning of the Loop

Information required to respawn the agent's loop at a particular iteration is stored as metadata in the transaction recorded on the Blockchain.

In this way, a transaction on the blockchain stores or provides access to information about a given iteration of the loop which is being executed on the agent. This information can include the values of any variables associated with the loop, such as index i, and any other necessary information such as values for parameters used in the code block or location-related data specifying where further required information can be accessed.

The metadata itself is stored as part of a multi-signature pay-to-script-hash script (P2SH) in the transaction. The metadata recorded with the transaction also gives the ability to record an audit trail of how the code has been executed in the past.

There are several ways in which the agent could respawn the repeat loop code block at each iteration. The code block might be hard-coded into the agent itself, or could be stored in a private or publicly available file, or stored as an entry on a private or public hash table file, or a combination of the above. The code block could be static with hard-coded variables or could be static but contain parameter(s) that can be populated. The parameters could be single values of any data format, or could be small chunks of code, or be combinations of the above. The parameters could be populated by retrieving them directly from metadata in a transaction (e.g. bitcoin transaction) or from an external source such as an internal database or a private/public file or hash table or any combination of the above. Pointers to the external source of parameter values might be stored in metadata in a transaction.

The following steps provide one example of how the agent can respawn a repeat loop code block at the ith iteration. In this example, the code registry is a hash table whereby the hash values act as look-up keys for the table and are stored in metadata on transactions.

1. The agent monitors the Blockchain for transactions that contain hashes of the code block that matches entries in the code registry.
2. The agent finds a transaction that contains the corresponding hash ($H_1$).
3. The agent reads the 'Metadata-CodeHash', gets the CodeHash field to get $H_1$ and uses it to retrieve the code ($C_1$). If RIPEMD-160(SHA256($C_1$)) equals $H_1$, the code has not been changed and it is safe to proceed to the next step.
4. The agent reads the 'Metadata-CodeHash' which stores the index I, and respawns the code at the $i^{th}$ iteration. In other words, the loop is 'reloaded' at the appropriate iteration
5. The signature of the User is included in the P2SH command to verify the origin of the metadata.
6. The agent reads the 'Metadata-OutputHash' and 'Metadata-OutputPointer' to retrieve the output of the previous steps, if these data are required for this iteration of the loop.

It will be appreciated that there are many different patterns for implementing bitcoin gates, based on different combinations of the variations mentioned above. The following are a selection of patterns for illustration only and are not intended to be limiting. Each pattern may be suitable for implementing one type of gate, or for several types, or for all types, depending on the specific attributes of the pattern and the intended use of the gate logic:

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented control method comprising:
- identifying a first blockchain transaction and a second blockchain transaction of a blockchain, a first locking script and a first unlocking script corresponding to the first blockchain transaction, and a second locking script and a second unlocking script corresponding to the second blockchain transaction;
- processing the second unlocking script using an output of the first blockchain transaction;
- executing, as a result of the processing, the first locking script and the second unlocking script, wherein:
  - executing the second unlocking script results in a first input and a second input; and
  - executing the first locking script includes:
    - evaluating the first input to a first value and evaluating the second input separately to a second value, the first value and the second value each being TRUE or FALSE, wherein each of the first input and the second input are evaluated against a respective locking script defining a condition to be satisfied; and
    - determining, based on the first value and the second value, an output by emulating the functionality of a logic gate using the first value and the second value as inputs to the logic gate, the output corresponding to a TRUE result or a FALSE result; and
- transmitting, based on the output corresponding to the TRUE result, the second transaction to a blockchain network for validation.

2. The method of claim 1, wherein the logic gate comprises an OR gate, NAND gate, a NOT gate, an XNOR gate, an IMPLY gate, or a Converse implication gate.

3. The method of claim 1, wherein the first value or the second value corresponds to at least one Boolean input derived or generated by testing or evaluating to a blockchain puzzle.

4. The method of claim 1, wherein the first locking script or second locking script comprises a hash of a script.

5. The method of claim 1, wherein the first locking script or second locking script is a P2SH locking script as known in Bitcoin protocol, or a functionally equivalent locking script in another blockchain protocol.

6. The method of claim 1, wherein executing the second unlocking script is performed within a script in a blockchain transaction.

7. The method of claim 1, and comprising the steps of:
- providing a computing resource arranged to influence the behaviour of a device or process based upon:
- detection of the second blockchain transaction within the blockchain or blockchain network; and/or
- the validity of the second transaction.

8. The method of claim 1, wherein validation of the second transaction within a blockchain network is dependent upon the execution of the second unlocking script.

9. The method of claim 1, further comprising the step of:
- controlling a device or process based upon the validity of the second transaction, wherein the validity is determined or established by a computer-based control agent, or by monitoring the blockchain network to determine if it has been validated by a network node, and/or by monitoring a state of the blockchain to determine whether the second transaction has been written to the blockchain.

10. The method of claim 1, wherein the first input and/or the second input comprises a numeric value, a constant value, a result of a hash function, a cryptographic key, a blockchain puzzle, and/or a Bitcoin other blockchain-related address.

11. The method of claim 1, wherein the first and/or second transaction is generated and/or transmitted to a blockchain network by an automated process executing on a computing-based resource.

12. A computer implemented system arranged to implement the method of claim 1.

13. A blockchain-implemented control system comprising:
- one or more processors; and
- memory storing instructions executable to cause the system to be operable to at least:
- receive a plurality of input signals;
- determine at least one Boolean input based at least in part on the received plurality of input signals; and
- execute a locking script and an unlocking script of respective blockchain transactions to provide a first output when one, and only one, input signal enables the generation of a hash value which is equal to a stored data item, wherein executing the unlocking script results in a first input and a second input; and executing the locking script includes:
  - evaluating the first input to a first value and evaluating the second input separately to a second value, the first value and the second value each being TRUE or FALSE, wherein each of the first input and the second input are evaluated against a respective locking script defining a condition to be satisfied; and
  - determining, based on the first value and the second value, an output by emulating the functionality of a logic gate using the first value and the second value as inputs to the logic gate, the output corresponding to a TRUE result or a FALSE result wherein the system is configured to monitor or search the blockchain or blockchain network to determine the presence or absence of a transaction which comprises the unlocking script.

14. The control system of claim 13, wherein the system is further operative to:

a derive a hash value for each of the inputs;

compare the hash value derived for each of the inputs with a stored hash value;

return a third value for each input in which the derived hash value is identical to a stored hash value;

return a second value for each input in which the derived hash value is not identical to a stored hash value; and determine the quantity of third values and issue the first output based on the determination.

15. The control system of claim 13, wherein, responsive to the control system providing a first output, the stored data item is regenerated.

16. The control system of claim 13, wherein the stored data item is regenerated in a random or pseudo-random manner.

17. The control system of claim 13, wherein a public key-private key pair is generated for each stored data item.

* * * * *